US010116422B2

(12) United States Patent
Chen et al.

(10) Patent No.: US 10,116,422 B2
(45) Date of Patent: Oct. 30, 2018

(54) MANAGING CROSS-CARRIER SCHEDULING IN CARRIER AGGREGATION WITH EPDCCH IN LTE

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 13/965,047

(22) Filed: Aug. 12, 2013

(65) Prior Publication Data

US 2014/0126485 A1 May 8, 2014

Related U.S. Application Data

(60) Provisional application No. 61/722,103, filed on Nov. 2, 2012.

(51) Int. Cl.
*H04L 5/00* (2006.01)
*H04L 27/00* (2006.01)
*H04L 27/34* (2006.01)

(52) U.S. Cl.
CPC ............ *H04L 5/0044* (2013.01); *H04L 5/001* (2013.01); *H04L 5/0053* (2013.01);
(Continued)

(58) Field of Classification Search
CPC ..... H04L 27/0012; H04L 27/34; H04L 5/001; H04L 5/0044; H04L 5/0053; H04L 5/0094; H04W 28/04; H04W 72/04
See application file for complete search history.

(56) References Cited

U.S. PATENT DOCUMENTS 8,630,673 B2    1/2014    Chakraborty et al.
8,705,461 B2 *   4/2014    Bala et al. .................... 370/329
(Continued)

FOREIGN PATENT DOCUMENTS

EP          2858439 A1    4/2015
WO     2010102035 A2    9/2010
(Continued)

OTHER PUBLICATIONS

Dahlman Erik et al., "4G LTE/LTE-Advanced for Mobile Broadband—Chapter 10", Mar. 29, 2011, pp. 145-202, XP055046016.
(Continued)

*Primary Examiner* — Khaled M Kassim
(74) *Attorney, Agent, or Firm* — Nerrie M. Zohn

(57) ABSTRACT

A method, an apparatus, and a computer program product for wireless communication are provided for cross-carrier scheduling when both PDCCH and EPDCCH are employed in a network that supports carrier aggregation. The apparatus receives a first component carrier and a second component carrier, where the first component carrier includes a first control channel, a second control channel, and carrier indication information. The first control channel corresponds to the first component carrier. The second control channel and the carrier indication information correspond to the second component carrier. The second control channel is one of at least a first type (e.g., PDCCH) or second type (e.g., EPDCCH) of control channel and the carrier indication information identifies the second component carrier for both the first and second types of control channels. The apparatus then processes the first and second control channels.

40 Claims, 19 Drawing Sheets

(52) U.S. Cl.
CPC ........ *H04L 5/0094* (2013.01); *H04L 27/0012* (2013.01); *H04L 27/34* (2013.01)

(56) References Cited

U.S. PATENT DOCUMENTS

| | | | |
|---|---|---|---|
| 8,971,260 B2* | 3/2015 | Nakao et al. .................. | 370/329 |
| 9,210,671 B2* | 12/2015 | Bostrom ............... | H04W 52/30 |
| 9,237,555 B2* | 1/2016 | Kim ........................ | H04L 5/001 |
| 2010/0303011 A1* | 12/2010 | Pan ......................... | H04L 5/001 370/328 |
| 2011/0105050 A1 | 5/2011 | Khandekar et al. | |
| 2011/0170496 A1 | 7/2011 | Fong et al. | |
| 2011/0228724 A1* | 9/2011 | Gaal ....................... | H04L 5/001 370/328 |
| 2011/0267957 A1* | 11/2011 | Du ........................ | H04L 5/0007 370/241 |
| 2011/0292887 A1* | 12/2011 | Baldemair ............ | H04L 5/0053 370/329 |
| 2012/0002635 A1* | 1/2012 | Chung et al. .................. | 370/329 |
| 2012/0076088 A1* | 3/2012 | Hwang ............. | H04W 72/1289 370/329 |
| 2012/0300718 A1 | 11/2012 | Ji et al. | |
| 2013/0003639 A1 | 1/2013 | Noh et al. | |
| 2013/0003692 A1* | 1/2013 | Nishio et al. .................. | 370/329 |
| 2013/0039284 A1 | 2/2013 | Marinier et al. | |
| 2013/0058240 A1* | 3/2013 | Kim et al. .................... | 370/252 |
| 2013/0128857 A1* | 5/2013 | Nakao ........................... | 370/329 |
| 2013/0142159 A1* | 6/2013 | Hong et al. .................. | 370/329 |
| 2013/0157660 A1* | 6/2013 | Awad ................. | H04W 72/046 455/435.1 |
| 2013/0195039 A1* | 8/2013 | Pan ......................... | H04L 5/001 370/329 |
| 2013/0215853 A1* | 8/2013 | Li .......................... | H04L 5/001 370/329 |
| 2013/0242814 A1* | 9/2013 | Wang et al. ................. | 370/280 |
| 2013/0242880 A1* | 9/2013 | Miao ..................... | H04L 5/001 370/329 |
| 2013/0329686 A1 | 12/2013 | Kim et al. | |
| 2013/0336198 A1* | 12/2013 | Kim et al. .................... | 370/315 |
| 2013/0336252 A1* | 12/2013 | Hsieh et al. .................. | 370/329 |
| 2014/0013596 A1 | 1/2014 | Stallwitz et al. | |
| 2014/0064205 A1* | 3/2014 | Feng et al. ................... | 370/329 |
| 2014/0086188 A1* | 3/2014 | Hoymann ............ | H04L 5/0053 370/329 |
| 2014/0092840 A1* | 4/2014 | Zeng et al. ................... | 370/329 |
| 2014/0106764 A1* | 4/2014 | Huang .............. | H04W 72/1252 455/452.1 |
| 2014/0140293 A1* | 5/2014 | Sharma et al. ............... | 370/329 |
| 2014/0301359 A1* | 10/2014 | Seo ........................ | H04L 5/0007 370/330 |
| 2014/0328293 A1* | 11/2014 | Seo et al. ....................... | 370/329 |
| 2014/0348090 A1* | 11/2014 | Nguyen ............. | H04W 72/042 370/329 |
| 2015/0304086 A1 | 10/2015 | Kim et al. | |

FOREIGN PATENT DOCUMENTS

| | | |
|---|---|---|
| WO | 2012124981 A2 | 9/2012 |
| WO | 2014062041 A1 | 4/2014 |

OTHER PUBLICATIONS

International Search Report and Written Opinion—PCT/US2013/067297—ISA/EPO—dated Dec. 20, 2013.
NEC Group: "DL Control channel enhancements with carrier aggregation", 3GPP Draft; R1-113228 DL Control Channel Enhancements With Carrier Aggregation Solutions for Release 11 , 3rd Generation Partnership Project (3GPP), Mobile Competence Centre; 650, Route Des Lucioles ; F-06921 Sophia-Antipolis Cedex ; France, vol. RAN WG1 , No. Zhuhai; Oct. 10, 2011, Oct. 4, 2011 (Oct. 4, 2011), XP050538346, [retrieved on Oct. 4, 2011].
NEC Group: "Search space design for E-PDCCH", 3GPP Draft; R1-120256, 3rd Generation Partnership Project (3GPP), Mobile Competence Centre; 650, Route Des Lucioles; F-06921 Sophia-Antipolis Cedex; France, vol. RAN WG1, No. Dresden, Germany; Feb. 6, 2012-Feb. 10, 2012, Jan. 31, 2012 (Jan. 31, 2012), XP050562810, [retrieved on Jan. 31, 2012].
Qualcomm Incorporated: "On cross-carrier scheduling with EPDCCH", 3GPP Draft; R1-125112 on Cross-Carrier Scheduling With EPDCCH, 3rd Generation Partnership Project (3GPP), Mobile Competence Centre; 650, Route Des Lucioles; F-06921 Sophia-Antipolis Cedex; France vol. RAN WG1, No. New Orleans, USA; Nov. 12, 2012-Nov. 16, 2012 Nov. 3, 2012 (Nov. 3, 2012), XP050662973, [retrieved on Nov. 3, 2012] the whole document.
Notification of a Preliminary Search Report with Opinion on Patentability, dated Feb. 8, 2016, 5 pages.
LG Electronics: "Discussion on eREG/eCCE Definition", 3GPP TSG-RAN WG1 Meeting #69 R1-122308, May 25, 2012, pp. 1-7, Section 2.1.

* cited by examiner

MANAGING CROSS-CARRIER SCHEDULING IN CARRIER AGGREGATION WITH EPDCCH IN LTE

CROSS-REFERENCE TO RELATED APPLICATIONS

This application claims the benefit of U.S. Provisional Application Ser. No. 61/722,103 entitled "MANAGING CROSS-CARRIER SCHEDULING IN CARRIER AGGREGATION WITH EPDCCH IN LTE" and filed on Nov. 2, 2012, which is expressly incorporated by reference herein in its entirety.

BACKGROUND

Field

The present disclosure relates generally to communication systems, and more particularly, to resource scheduling when carrier aggregation is used in wireless access networks.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

A method, an apparatus, and a computer program product for wireless communication are provided for cross-carrier scheduling when both physical downlink control channel (PDCCH) and enhanced physical downlink control channel (EPDCCH) are employed in a network that supports carrier aggregation. In an aspect, the apparatus receives a first component carrier and a second component carrier, where the first component carrier includes a first control channel, a second control channel, and carrier indication information. The first control channel corresponds to the first component carrier. The second control channel and the carrier indication information correspond to the second component carrier. The second control channel is one of at least a first type (e.g., PDCCH) or second type (e.g., EPDCCH) of control channel and the carrier indication information identifies the second component carrier for both the first and second types of control channels. The apparatus then processes the first and second control channels.

DETAILED DESCRIPTION

Figure 1:
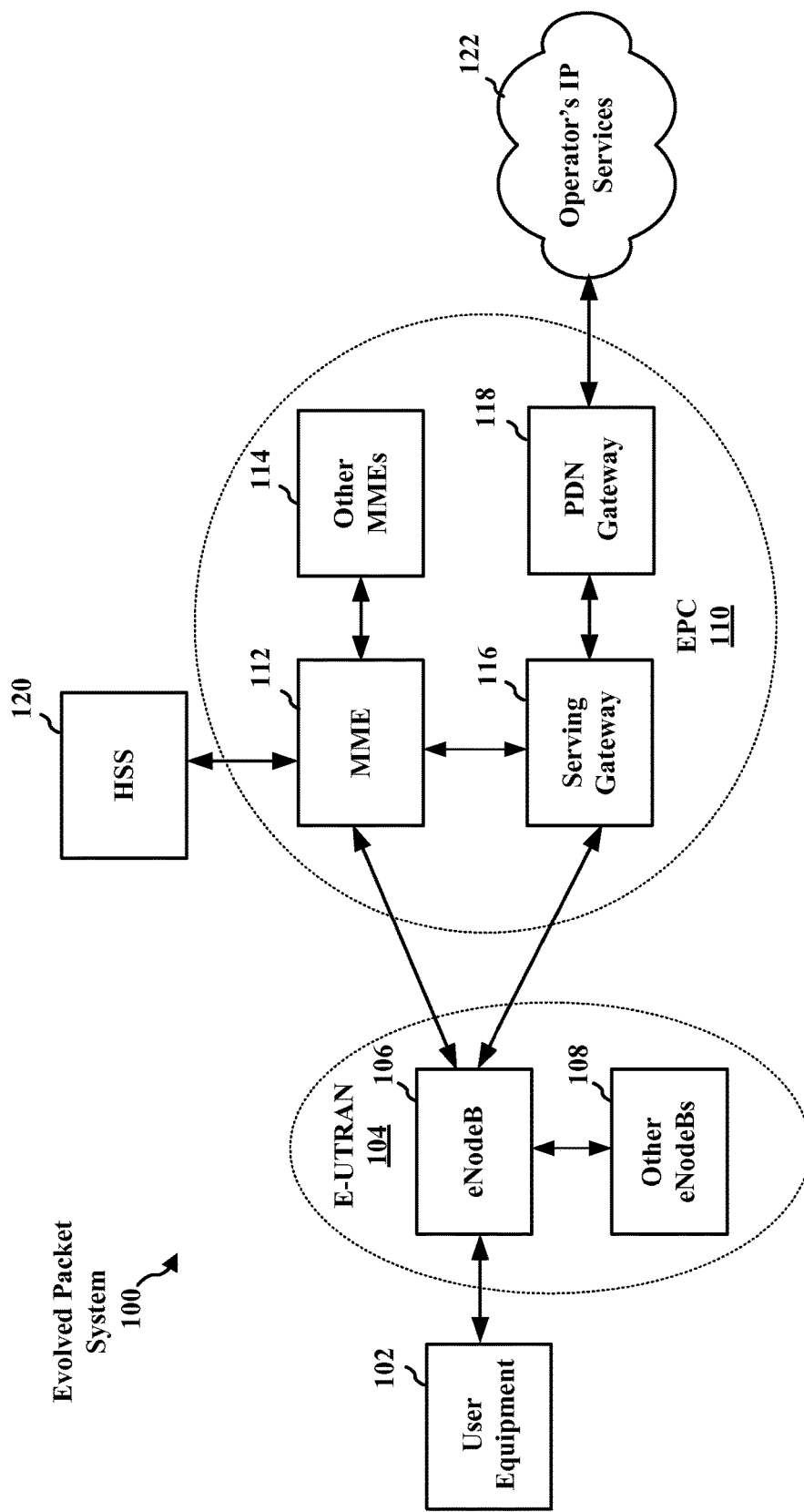
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110 (e.g., by an S1 interface). The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
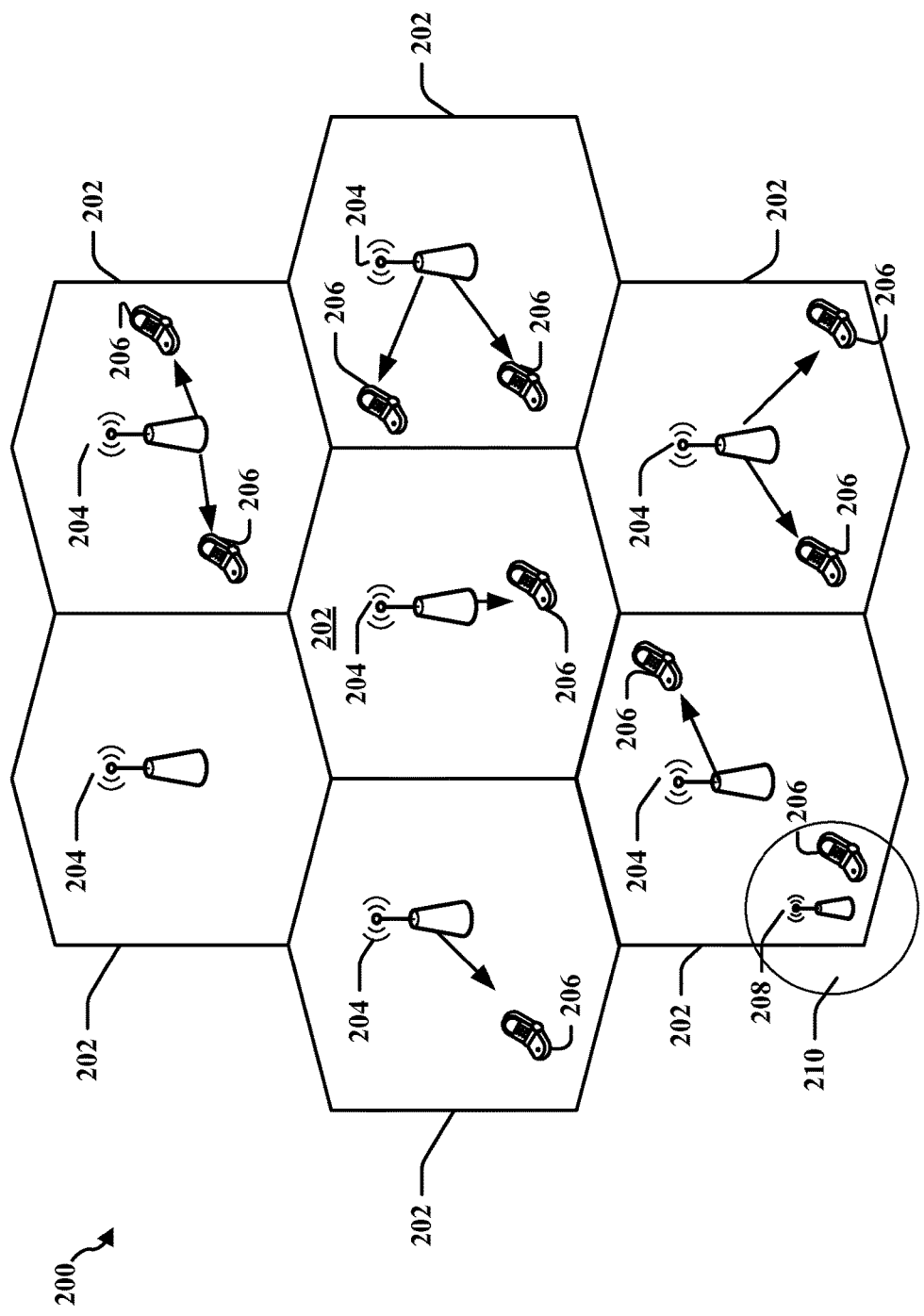
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
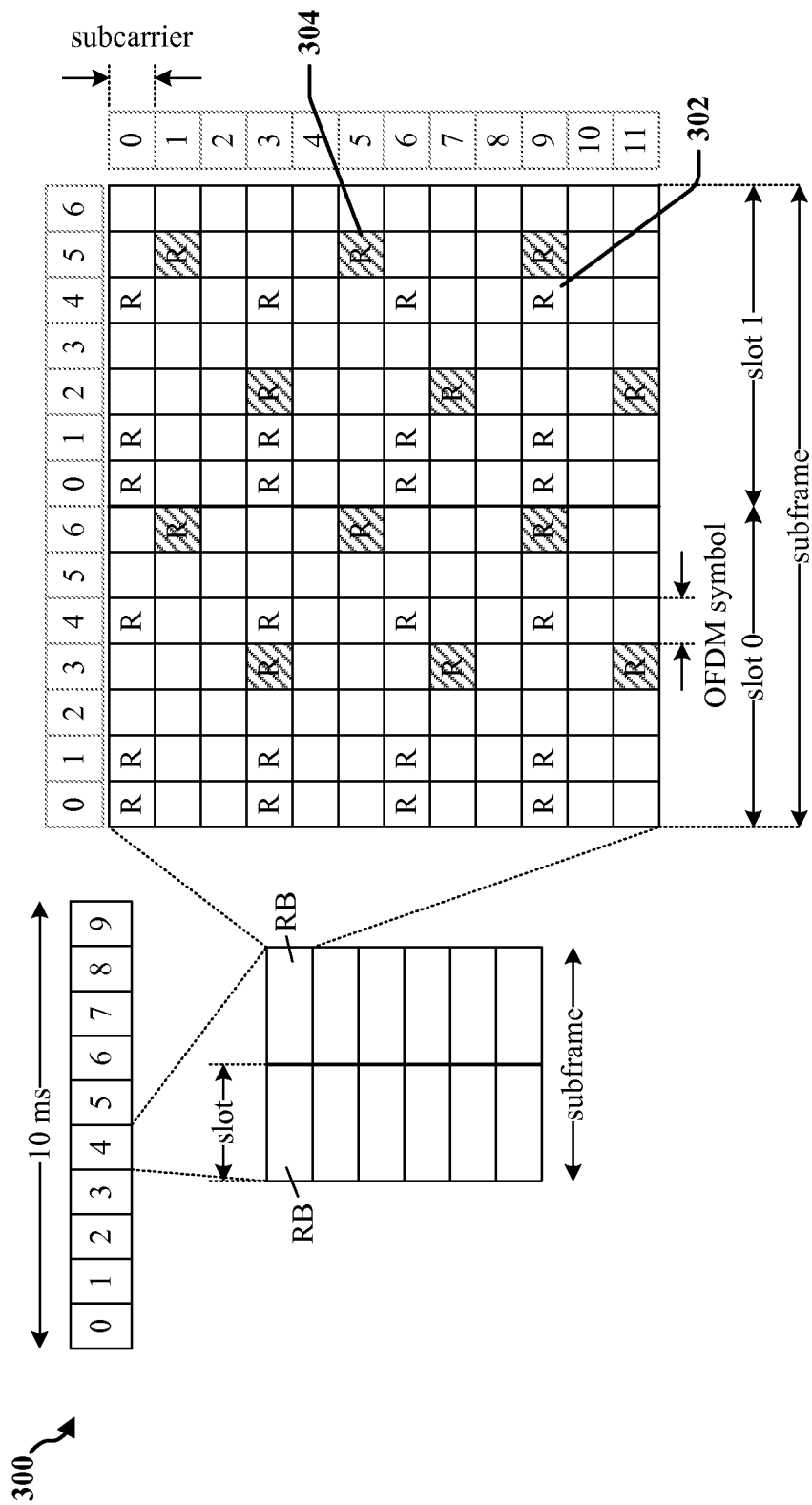
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements (REs). In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
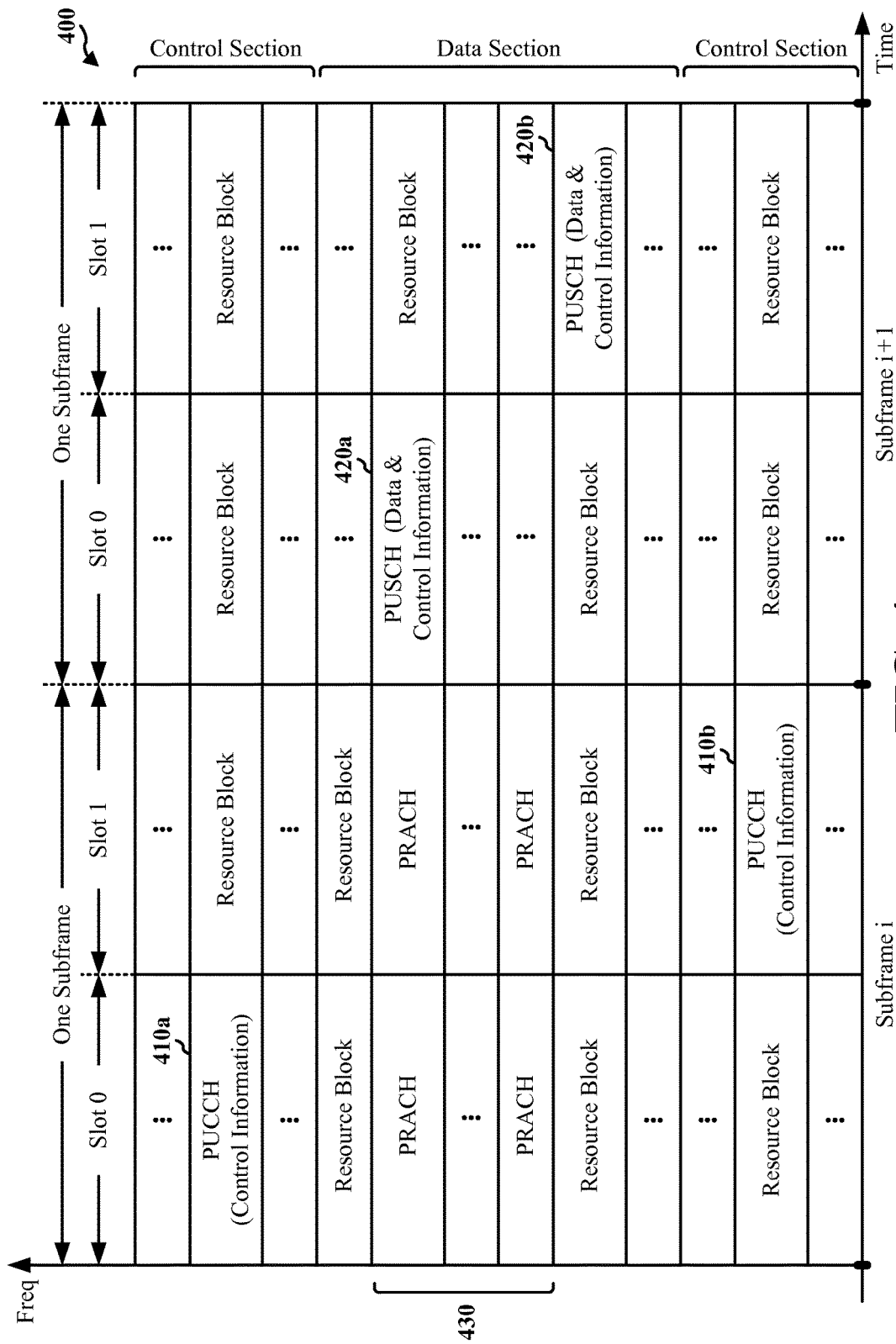
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
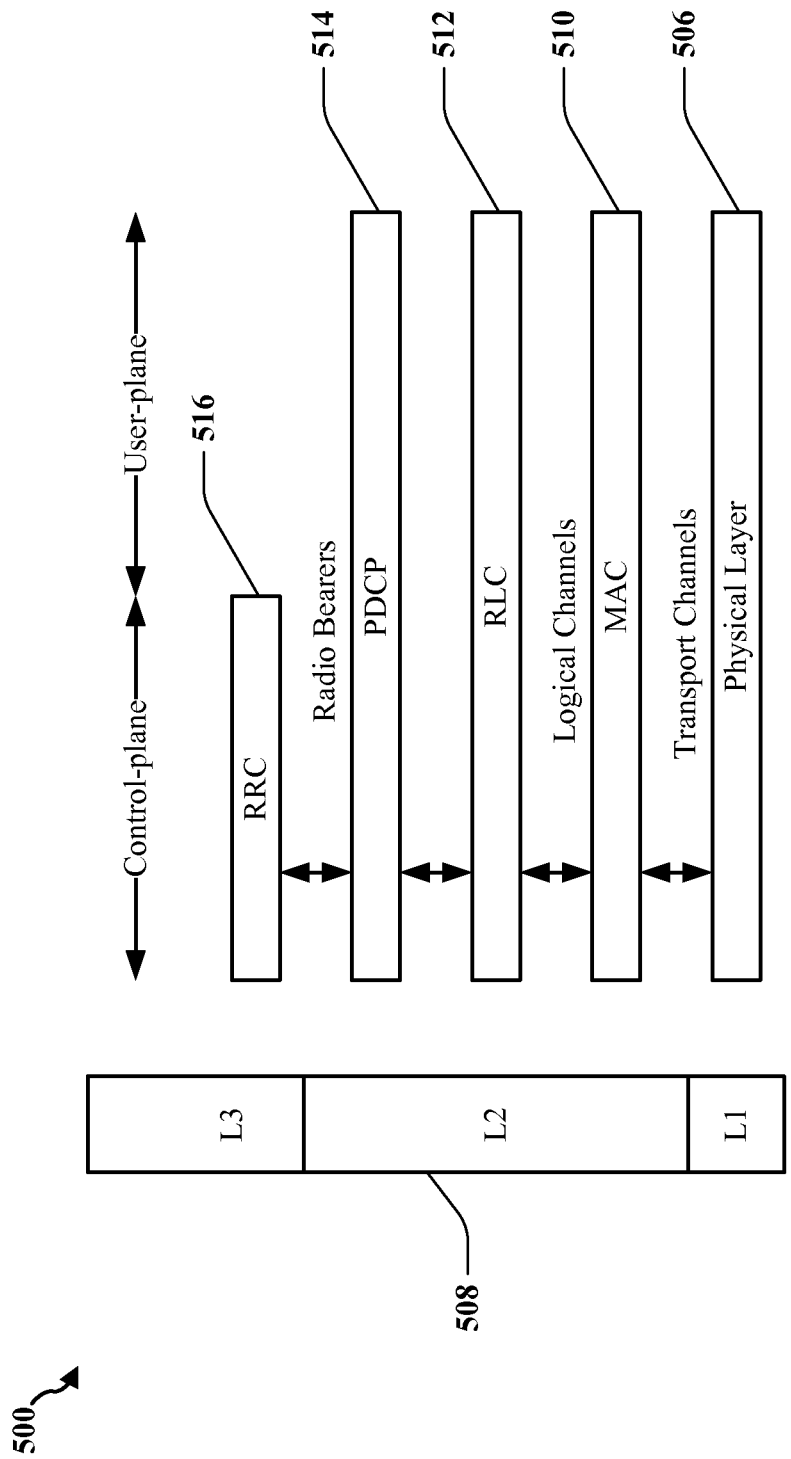
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
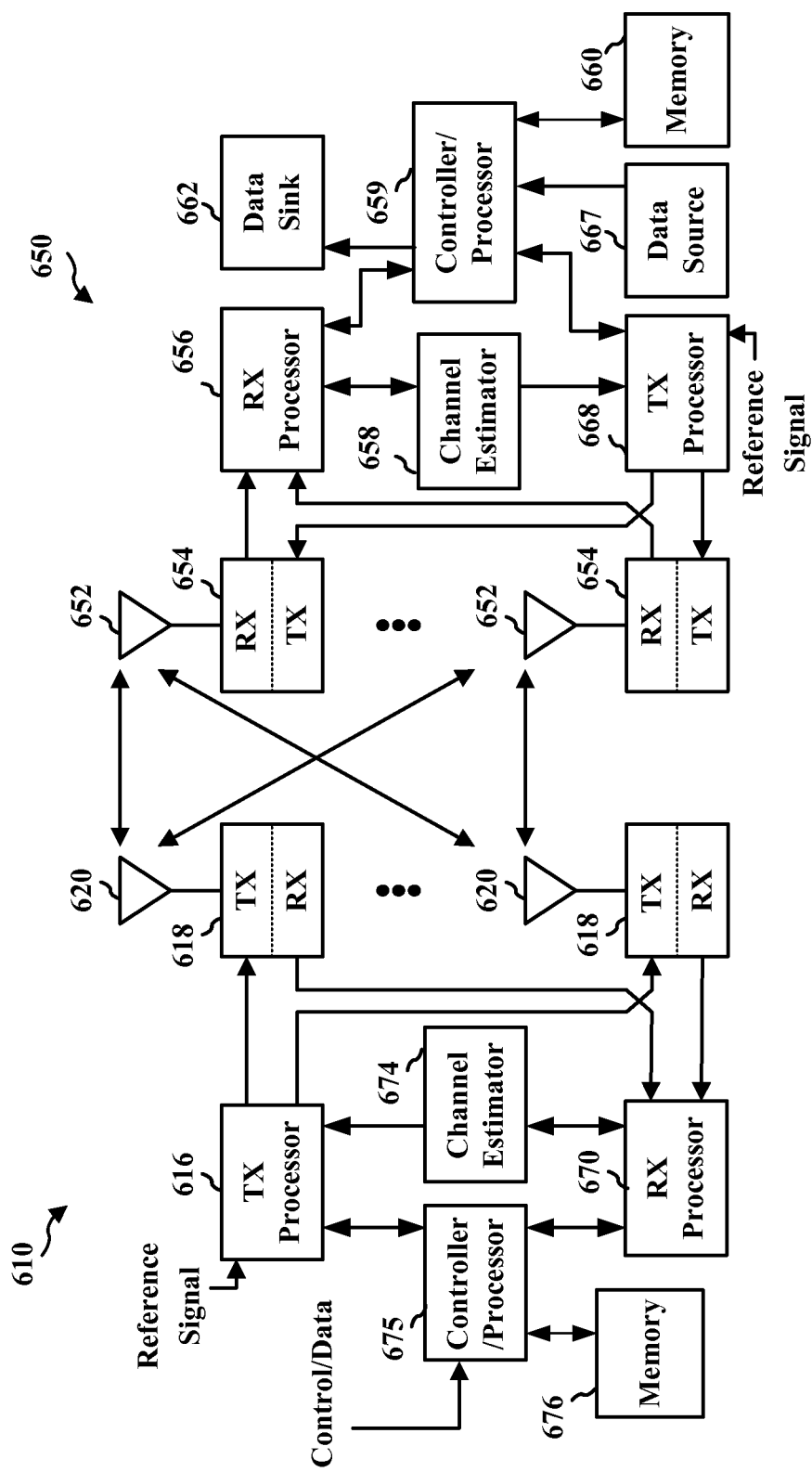
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
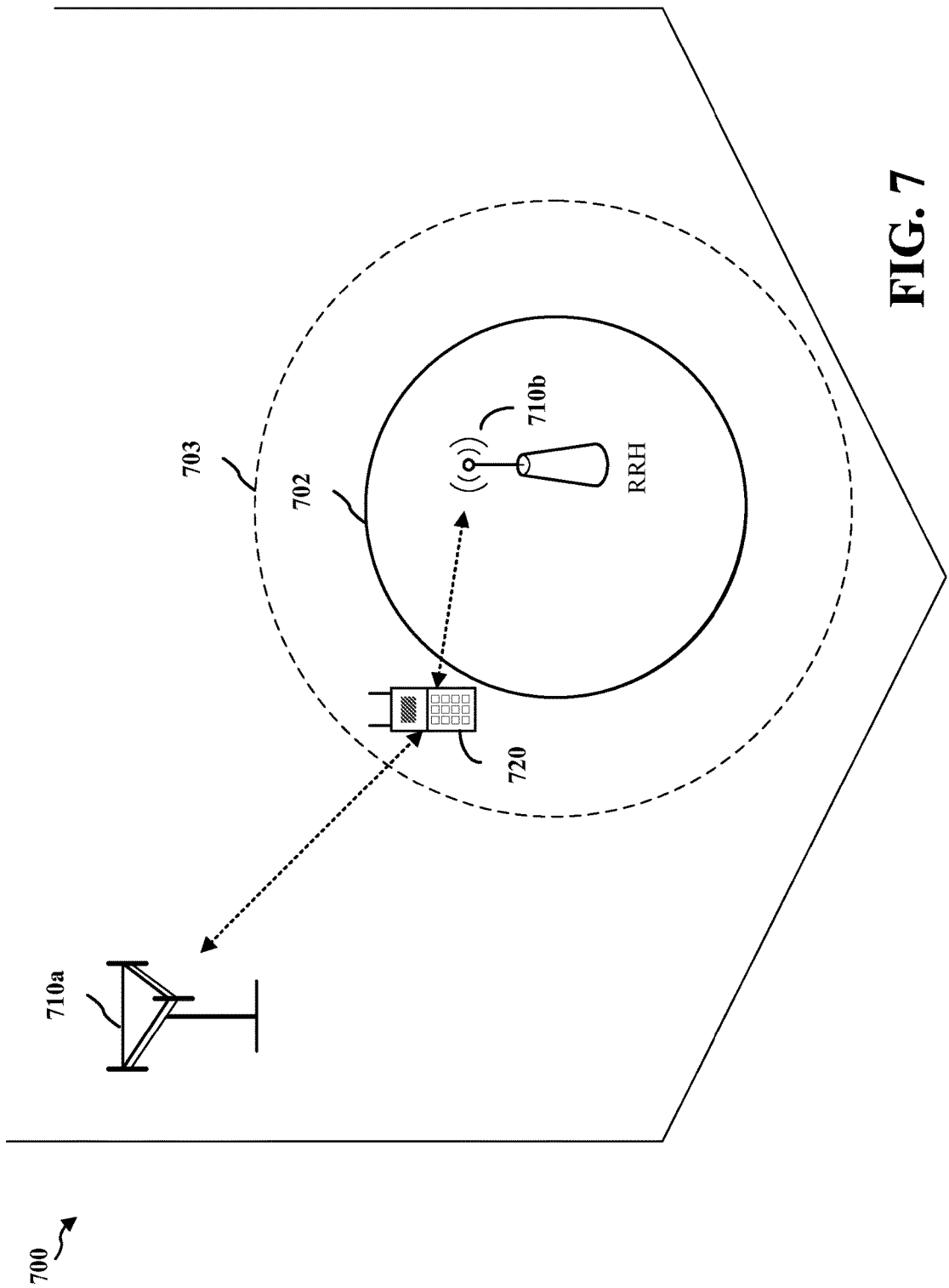
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

In the LTE context, a UE can be configured to handle up to five component carriers (CCs) for carrier aggregation (CA), where one of the component carriers is designated as the primary CC (PCC) while the remaining component carriers are referred to as secondary CCs (SCC). Cross-carrier scheduling may be supported for a UE with CA, where a PDSCH can be scheduled on an SCC (also referred to as the scheduled CC) by a physical downlink control channel (PDCCH) on a different CC (also referred to as the scheduling CC) which can be a PCC or an SCC. In this case, a 3-bit cross-carrier indicator field (CIF) may be included in the downlink control information (DCI) for both the scheduling CC and the scheduled CC. The scheduling CC may include a UE-specific search space not only for itself, but also for the CCs that are cross-scheduled by the scheduling CC. The two or more UE-specific search spaces for PDSCH transmissions on two or more different CCs can be a function of the CIFs configured for each respective CC, and may be designed to avoid search space overlapping among the two or more CCs if practical.

DCI may be carried in a PDCCH. DCI may include transmission resource assignments and other control information for a UE or group of UEs. PDCCH is located in a first several symbols in a subframe and are fully distributed across the entire system bandwidth. PDCCH is time division multiplexed with PDSCH. The PDCCH is transmitted in a subframe and the subframe is effectively divided into a control region and a data region.

Enhanced PDCCH (EPDCCH) can facilitate frequency-domain based inter-cell interference coordination and the presence of EPDCCH on a carrier may be subframe dependent, such that EPDCCH may not always be present in all subframes.

Whereas PDCCH occupies the first several control symbols in a subframe, EPDCCH occupies the data region of the subframe, similar to PDSCH. Certain enhancements may be enabled by EPDCCH, including increased control channel capacity, support for frequency-domain inter-cell interference coordination (ICIC), improved spatial reuse of control channel resources, and support for beamforming and/or diversity. Moreover, EPDCCH may be used in additional new carrier types and in subframes of a multicast-broadcast single frequency network (MBSFN). Typically, EPDCCH can coexist on the same carrier as legacy UEs configured to obtain control information from PDCCH.

In certain aspects, both localized and distributed transmission of EPDCCH is supported. A user equipment—reference signal (UE-RS) (also referred to as demodulation reference signal "DM-RS") based EPDCCH may be supported. UE-RS may use antenna ports 107, 108, 109, and 110, whereas PDSCH utilizes antenna ports 7-14.

EPDCCH is based on frequency division multiplexing (FDM), spanning both the first and second slots of a subframe. A restriction may be placed on the maximum number of transport channel (TrCH) bits receivable in a transmission time interval (TTI) such that a relaxation of the processing requirements for the UE can be achieved. For example, the restriction on the maximum number of TrCH bits receivable in a TTI may depend on UE capability or whether a condition is satisfied (e.g., when RTT>100 us). Multiplexing of PDSCH and EPDCCH within a physical resource block (PRB) pair may not be permitted. In one example, a PRB may be configured as a unit of transmission resource comprising 12 sub-carriers in the frequency domain and 1 timeslot (0.5 ms) in the time domain.

An RE that collides with any other signal is typically not used for EPDCCH. Coding chain rate-matching may be used for cell-specific reference signals (CRS), and for new antenna ports on a new carrier type (NCT). Coding chain rate-matching may be also used for a legacy control region (a region up to the PDSCH starting position) for physical broadcast channel (PBCH) and PSS and/or secondary synchronization signals (SSS) when EPDCCH transmission in these PRB pairs is supported. Coding chain rate-matching may be also used around zero power (ZP) and non-zero power (NZP) channel state information reference signals (CSI-RS) configured for the UE receiving the EPDCCH.

In subframes where a UE monitors EPDCCH UE search space (USS) on a first carrier, the UE typically does not monitor PDCCH USS on the same carrier. A configuration may define whether localized or distributed EPDCCH candidates are monitored in a particular subframe. The UE also typically monitors the common search space (CSS) on PDCCH. Alternatively, the UE may monitor the CSS on ePDCCH, if CSS on ePDCCH is supported in the subframe, e.g., in a new carrier type. The UE can be configured to monitor both localized and distributed EPDCCH candidates in a subframe. If the UE is configured to monitor both localized and distributed EPDCCH candidates in a subframe, the total number of USS blind decodes on the carrier may not be increased.

The subframes in which EPDCCH USS is monitored by the UE may be predefined by networking standards. In one example, in non-special subframes with a configuration of 0 and 5 for normal cyclic prefix (CP), and 0 and 4 for extended CP, EPDCCH may not be monitored by the UE. Monitored subframes can also be configured by higher layer signaling. In subframes not configured for monitoring EPDCCH, the UE may monitor CSS and/or USS on PDCCH.

A UE can be configured with K EPDCCH resource sets (where K≥1), e.g. up to two sets. An EPDCCH resource set may be defined as a group of N PRB pairs, and each EPDCCH resource set may define its own size (e.g., 2, 4 or 8 PRB pairs). The total number of blind decoding attempts is independent from K, and the total blind decoding attempts for a UE may be split into configured K EPDCCH resource sets. Each EPDCCH resource set may be configured for either localized EPDCCH or distributed EPDCCH. PRB pairs of EPDCCH resource sets with different logical EPDCCH set indices can be fully overlapped, partially overlapped, or may be non-overlapping.

The same scrambling sequence generator defined for a PDSCH UE-RS can be used for EPDCCH UE-RS. In one example, the scrambling sequence generator of UE-RS for EPDCCH on ports 107 through 110 is initialized by:

$$c_{init}=(\lfloor n_s/2 \rfloor+1)\cdot(2X+1)\cdot 2^{16}+n_{SCID}$$

where $c_{init}$ represents an initialization value, $n_s$ represents a slot number within a radio frame, X represents a candidate value, and represents a scrambling identifier. For example, X may be configured by UE-specific higher layer signaling, one value per set, and the default value of X for the second set may be the same as the value for the first set.

A starting symbol may be preconfigured for EPDCCH. The starting symbol may be configured by per-cell, higher layer signaling, which may be transmitted to indicate the OFDM starting symbol for any EPDCCH sent on a cell and PDSCH on that cell may be scheduled by EPDCCH. If the starting symbol is not provided, the starting OFDM symbol of EPDCCH and PDSCH scheduled by EPDCCH is typically derived from a physical control format indicator channel (PCFICH). A single value of OFDM starting symbol may be applicable to both EPDCCH resource sets, when two sets are configured. Alternatively, the OFDM starting symbol may be separately configured for each of the K EPDCCH resource sets.

Quasi-collocation (QCL) may be used with EPDCCH. A UE may be configured by higher layer signaling and a QCL-CSI-RS-Index can be transmitted to indicate the quasi-collocation assumption as EPDCCH UE-RS. The QCL-CSI-RS-Index may be configured per EPDCCH resource set. When signaling is provided, EPDCCH UE-RS ports typically may not be assumed as quasi co-located with any RS port, with the exception that all EPDCCH UE-RS ports within the EPDCCH resource set may be assumed as quasi co-located with the CSI-RS resource indicated by QCL-CSI-RS-Index with respect to delay spread, doppler spread, doppler shift, and/or average delay. It should be noted that the QCL-CSI-RS-Index corresponds to a non-zero power CSI-RS resource from a coordinated multipoint (CoMP) measurement set.

When signaling is not provided, all EPDCCH UE-RS ports may be assumed to be quasi co-located with CRS for the serving cell with respect to delay spread, doppler spread, doppler shift, and/or average delay.

EPDCCH is transmitted on enhanced control channel elements (eCCEs). An eCCE may be formed by a number N enhanced resource element groups (eREGs) in distributed and localized transmission. In a normal subframe (with normal CP) or special subframe configurations 3, 4, 8 (with normal CP), N may be set to 4. For example, when N is set to 4, four eCCEs per PRB pair are used in localized transmission. In special subframe configurations 1, 2, 6, 7, 9 (with normal CP), a normal subframe (with extended CP), and special subframe configurations 1, 2, 3, 5, 6 (with extended CP), N may be set to 8. For example, when N is set to 8, two eCCEs per PRB pair are used in localized transmission.

In normal subframes (with normal CP) or special subframe configurations 3, 4, 8 (with normal CP), and where the available REs in a PRB pair is less than $X_{thresh}$, the aggregation levels supported for EPDCCH include 2, 4, 8 (working assumption: 16 subject to feasible search space design) for localized EPDCCH and 2, 4, 8, 16 (working assumption: 32 subject to feasible search space design) for distributed EPDCCH. In all other cases, the supported aggregation levels include 1, 2, 4 (working assumption: 8 subject to feasible search space design) for localized EPDCCH and 1, 2, 4, 8 (working assumption: 16 subject to feasible search space design) for distributed EPDCCH.

Aggregation levels supported for EPDCCH when $X_{thresh}$=104: the number of available REs used to compare to $X_{thresh}$ is counted from the UE perspective by considering the UE-specific CSI-RS configuration, but not the CSI-RS configurations for other UEs. The total number of EPDCCH USS blind decodes per CC is typically 32 or 48 depending on the configuration of UL MIMO.

When carrier aggregation is used with PDCCH, a CSS is typically defined only on the PCC. System information of other CCs, such as SCCs, can be conveyed via dedicated signaling. If no cross-carrier signaling is involved, a UE-specific search space may be applied.

When cross-carrier signaling is employed, PDCCH CC and PDSCH/PUSCH CC may be different. One higher-layer configured PDCCH CC may schedule PDSCH/PUSCH CC. A paired PDSCH CC and PUSCH CC are typically always scheduled from the same PDCCH CC, instead of from different PDCCH CCs.

DCI messages may be generated and channel coded according to the required DCI and PDCCH format, PDCCH scrambling, modulation, precoding and layer mapping. The resultant symbols may be mapped onto REs, which may comprise REGs and/or control channel elements (CCEs). A UE monitors PDCCH and extracts its own control information from information associated with other UEs. The detailed control channel structure is typically not provided to the UE and the UE may attempt blind decoding of the control region.

A PDCCH on a CC must typically schedule PDSCH and PUSCH on the same CC. As a result, a PDCCH CC under cross-carrier scheduling may have two or more UE-specific search spaces. The two or more UE-specific search spaces may be derived conventionally and may further be a function of the 3-bit CIF. UE-specific search spaces may or may not overlap. In CA systems, cross-carrier scheduling is used to schedule resources on SCC from a PDCCH transmitted on a different CC. The CIF on PDCCH indicates on which carrier a scheduled resource is located.

Figure 8:
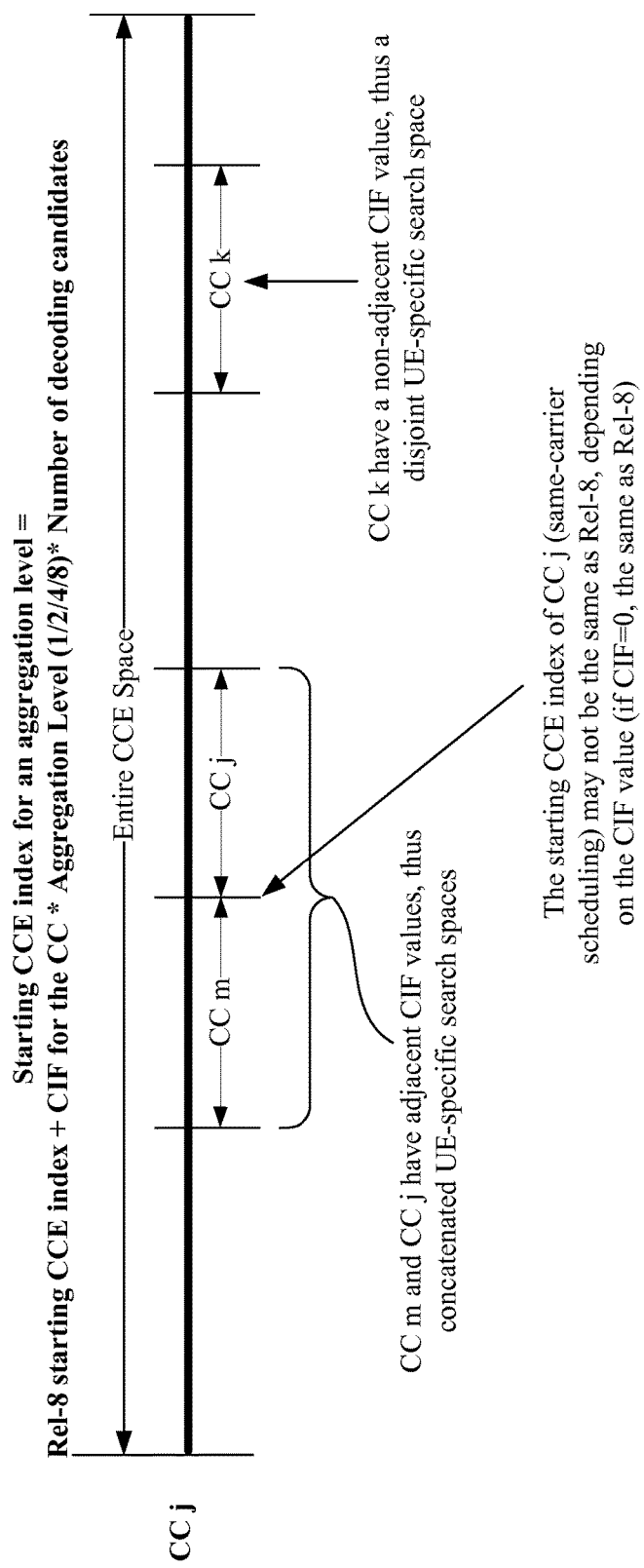
FIG. 8 illustrates UE-specific search spaces in cross-carrier scheduling.

FIG. 8 illustrates UE-specific search spaces in cross-carrier scheduling. In the configuration of FIG. 8, a specific aggregation level (1/2/4/8) is assumed. The UE is required to perform blind decoding as it is not aware of the detailed control channel structure, including the number of control channels and the number of CCEs to which each control channel is mapped. The max number of blind decodes linearly increases with the number of CCs.

Certain aspects provide systems and methods in which cross-carrier scheduling is provided when EPDCCH is configured for a UE with carrier aggregation. In some aspects EPDCCH is used in CA-based systems that also support PDCCH.

In some aspects, the UE is configured not to monitor EPDCCH for an SCC. That is, the SCC solely relies on PDCCH for scheduling DL and UL transmissions for the SCC. In this case, cross-carrier scheduling can be configured even where the UE is configured to monitor EPDCCH for one or more other CCs. In other words, if an SCC is not configured with EPDCCH for a UE, cross-carrier scheduling based on legacy PDCCH should be supported for the SCC, regardless of whether or not the UE is configured with EPDCCH for other CCs.

In an aspect, an SCC is configured with EPDCCH, and the EPDCCH is configured to be present in all downlink subframes. In one example, EPDCCH for the SCC may be transmitted on another CC, particularly if that CC is subject to less interference. In this case, EPDCCH is under cross-carrier scheduling, and the 3-bit CIF can be included in the EPDCCH. In another example, no CIF is provided for EPDCCH and EPDCCH is transmitted on the SCC. In another example, no CIF is provided for EPDCCH and EPDCCH is transmitted on a CC other than the SCC.

In an aspect, SCC is configured with EPDCCH, and the EPDCCH is configured for a subset of downlink subframes for the SCC. In one example, PDCCH is transmitted with CIF on the scheduling CC and EPDCCH is transmitted without CIF on the SCC. In this example, the UE may need to monitor legacy PDCCH and EPDCCH on different CCs corresponding to PDSCH transmissions on the SCC. Some subframes of the scheduling cell may not include cross-carrier scheduling for any other CC using PDCCH and the 3-bit CIF in this subframe would not be useful.

Figure 9:
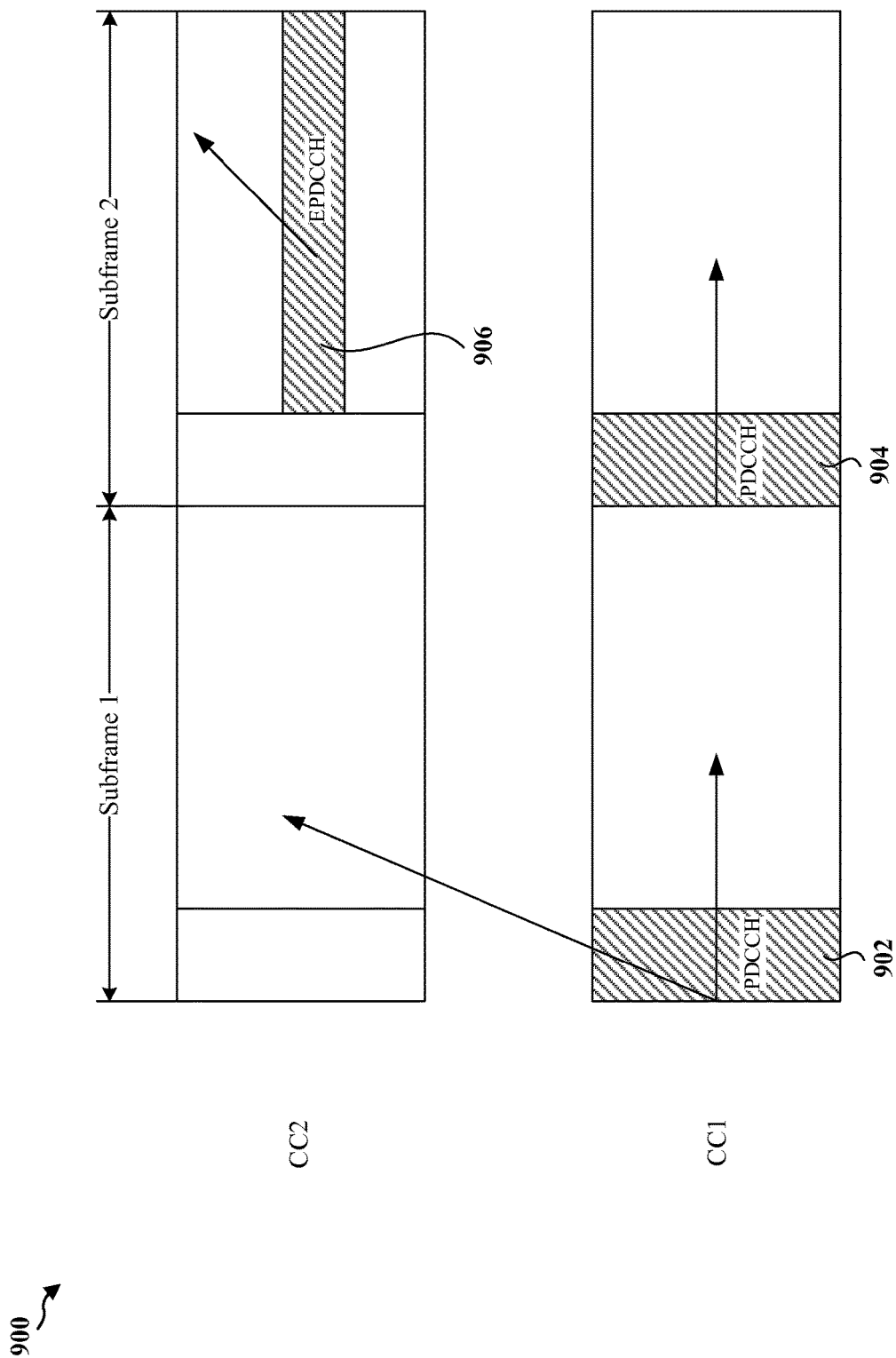
FIG. 9 is a diagram illustrating subframes of a first component carrier and a second component carrier.

FIG. 9 is a diagram 900 illustrating subframes of a first CC (also referred to as "CC1") and a second CC (also referred to as "CC2"). In the configuration of FIG. 9, CC1 is the scheduling CC and CC2 is the scheduled CC. Alternatively stated, CC2 is cross-carrier scheduled by CC1.

With reference to FIG. 9, in subframe 1, CC2 is cross-carrier scheduled via a legacy control channel and a CIF transmitted in region 902 of CC1. For example, the legacy control channel may be PDCCH and the CIF may be a 3-bit value (e.g., "001") corresponding to CC2. In subframe 2, CC1 is scheduled via a legacy control channel transmitted in region 904 of CC1, and CC2 is scheduled via a new control channel transmitted in region 906 of CC2. For example, the legacy control channel may be PDCCH and the new control channel may be EPDCCH.

In an aspect, in subframe 1 of FIG. 9, CC1 may contain UE-specific search spaces for both CC1 and CC2, and CIF may be necessary to differentiate the search spaces for the two CCs. However, in subframe 2, CC1 may contain a UE-specific search space only for CC1 and, therefore, CIF may not be necessary. Therefore, it is possible to remove the CIF (e.g., a 3-bit CIF) in DCI for CC1 in subframe 2 while including the CIF in subframe 1 in order to preserve resources. Accordingly, in some aspects, the presence of CIF in subframes on the scheduling cell using PDCCH may be subframe dependent. Alternatively, the CIF is included in all subframes on CC1 for simplicity.

Figure 10:
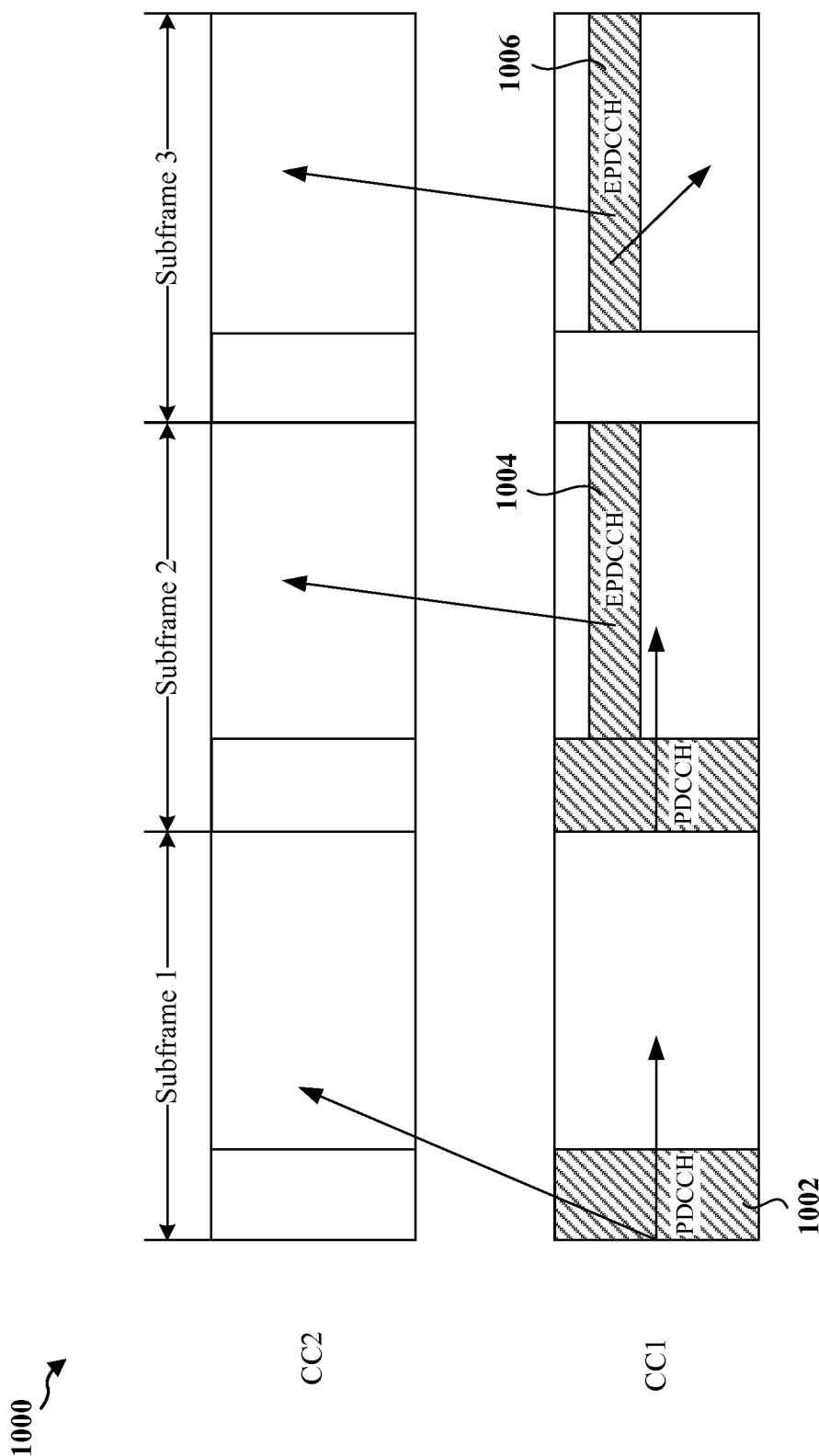
FIG. 10 is a diagram illustrating subframes of a first component carrier and a second component carrier.

FIG. 10 is a diagram 1000 illustrating subframes of CC1 and CC2. In an aspect, PDCCH with CIF and EPDCCH with CIF may be transmitted and cross-carrier scheduling may be enabled for both PDCCH and EPDCCH. The arrows in FIG. 10 indicate the CC being scheduled by a given downlink control channel. For example, in subframe 1 in FIG. 10, CC2 may be cross-carrier scheduled via a legacy control channel (e.g., PDCCH) and a CIF transmitted in region 1002 of CC1. In subframe 2, CC2 may be cross-carrier scheduled via a new control channel (e.g., EPDCCH) and a CIF transmitted in region 1004 of CC1. In an aspect, both the scheduling CC (e.g., CC1 in FIG. 10) and the scheduled CC (e.g., CC2 in FIG. 10) may be configured with EPDCCH in the same subframe (e.g., EPDCCH 1006 in subframe 3). In this example, it is possible for the two CCs to share the same EPDCCH resource configuration configured for CC1 for defining the two UE-specific search spaces (one for CC1 and one for CC2). Alternatively, the UE can be configured with two separate EPDCCH resource configurations for CC1 and CC2. In any case, some offset between the two UE-specific search spaces may be provided to avoid search space overlapping for the two CCs. In addition, the same rate matching and/or quasi-co-location operation can be specified for EPDCCH of CC1 and EPDCCH of CC2, since both are located on the same CC (CC1 in this example).

When CIF is supported for EPDCCH, different search spaces may be defined for the scheduling cell and the cross-carrier scheduled SCC. In one example, the resource set or sets specified for the scheduling cell may be shared among all CCs scheduled by the scheduling cell. A CC-specific search space offset may be introduced to separate search spaces for different CCs. Therefore, the QCL definition can be CC-independent provided the EPDCCH is transmitted from the same CC and the same QCL specification can be defined, even if the corresponding PDSCH may be located on different CCs. In another example, one or more separate resource sets are specified for the scheduling CC and the scheduled CC. In this example, some CC-specific search space offset may still be introduced, and the QCL definition may still be defined in a CC-independent manner.

In an aspect, if an SCC is configured to be cross-carrier scheduled with legacy PDCCH for a UE, EPDCCH may not be configured on the SCC for the UE. In an aspect, cross-carrier scheduling with legacy PDCCH may not be permitted for an SCC for a UE when the SCC is configured with EPDCCH for the UE. For example, the SCC may not be cross-carrier scheduled if it is configured with EPDCCH for the UE.

Figure 11:
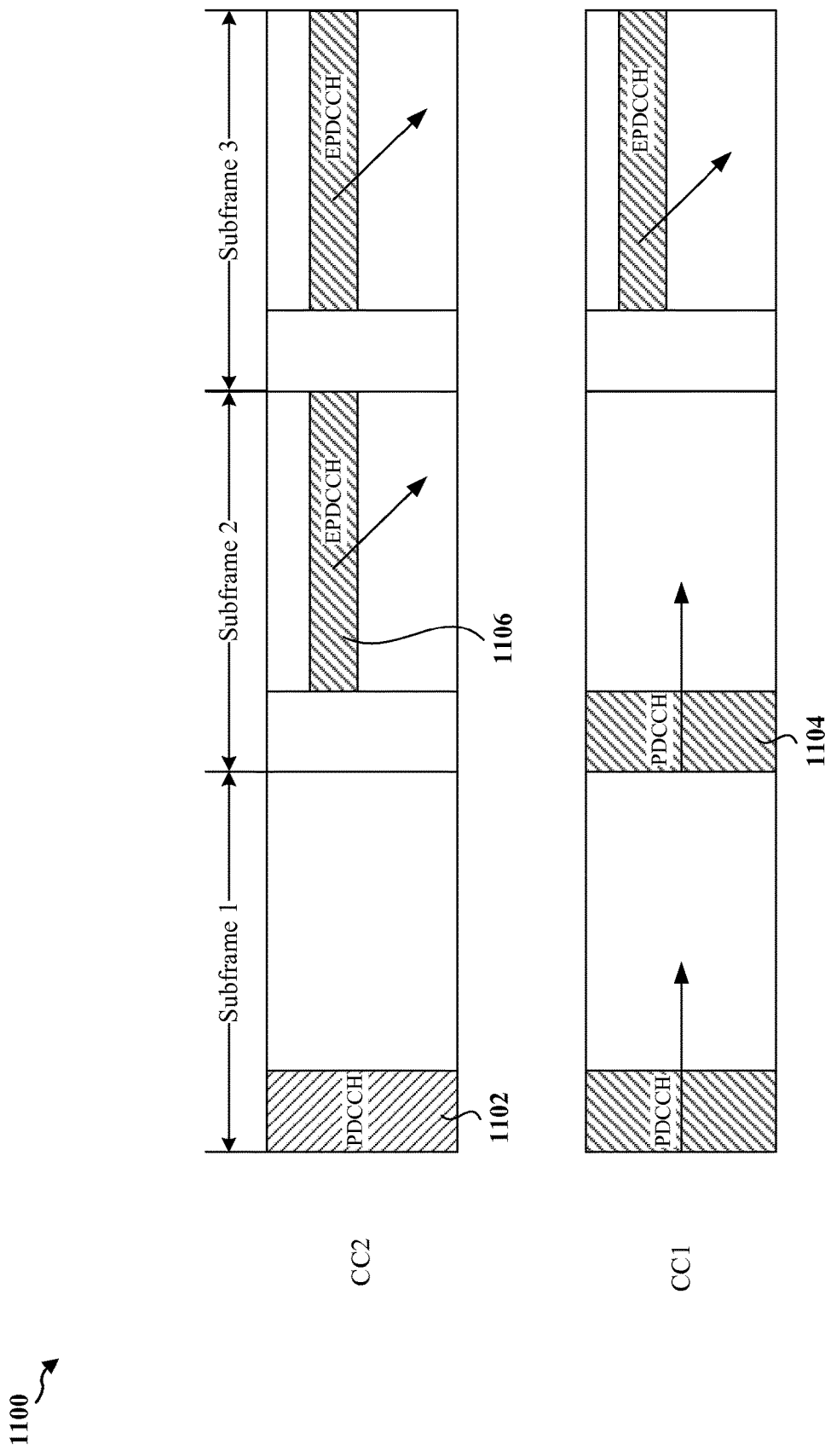
FIG. 11 is a diagram illustrating subframes of a first component carrier and a second component carrier.

FIG. 11 is a diagram 1100 illustrating subframes of CC1 and CC2. With reference to FIG. 11, in the subframes on CC2 (e.g., the SCC) when EPDCCH is not configured (e.g., subframe 1), a UE may instead monitor the PDCCH UE-specific search space in control region 1102. However, since the control region 1102 may be subject to overwhelming inter-cell interference from the UE perspective, the UE may alternatively skip monitoring of PDCCH in the subframes not configured by EPDCCH on the SCC. The EPDCCH may be subframe dependent, and when a subframe does not have EPDCCH, the UE may monitor PDCCH instead. For example, with reference to subframe 2 in FIG. 11, the UE may monitor the PDCCH transmitted in region 1104 on CC1 and may monitor EPDCCH transmitted in region 1106 on CC2. However, in some aspects, the UE may skip decoding control in a subframe. A UE can determine whether to skip monitoring legacy control in a subframe via signaling or via implementation (e.g., by detecting whether a subframe is subject to strong interference or not).

In an alternative aspect, cross-carrier scheduling may be used for EPDCCH. When cross-carrier scheduling for EPDCCH for an SCC is employed, PDCCH and EPDCCH for the SCC may be treated the same in terms of cross-carrier scheduling. For example, EPDCCH and PDCCH may have the same CIF definition and may be under the same signaling that enables/disables the cross-carrier scheduling for the cross-carrier scheduled SCC. Both PDCCH and EPDCCH for the scheduled SCC may be transmitted on the same scheduling CC. For example, with reference to FIG. 10, CC2 may be cross-carrier scheduled in subframe 1 via PDCCH and a CIF transmitted in control region 1002 of CC1. In such example, the CIF may be a 3-bit value corresponding to CC2. In subframe 2, CC2 may be cross-carrier scheduled via EPDCCH and a CIF transmitted in region 1004 of CC1. In such example, the CIF used for cross-carrier scheduling the CC2 via EPDCCH in subframe 2 may be the same 3-bit value corresponding to CC2 used for cross-carrier scheduling the CC2 via PDCCH in subframe 1.

Figure 12:
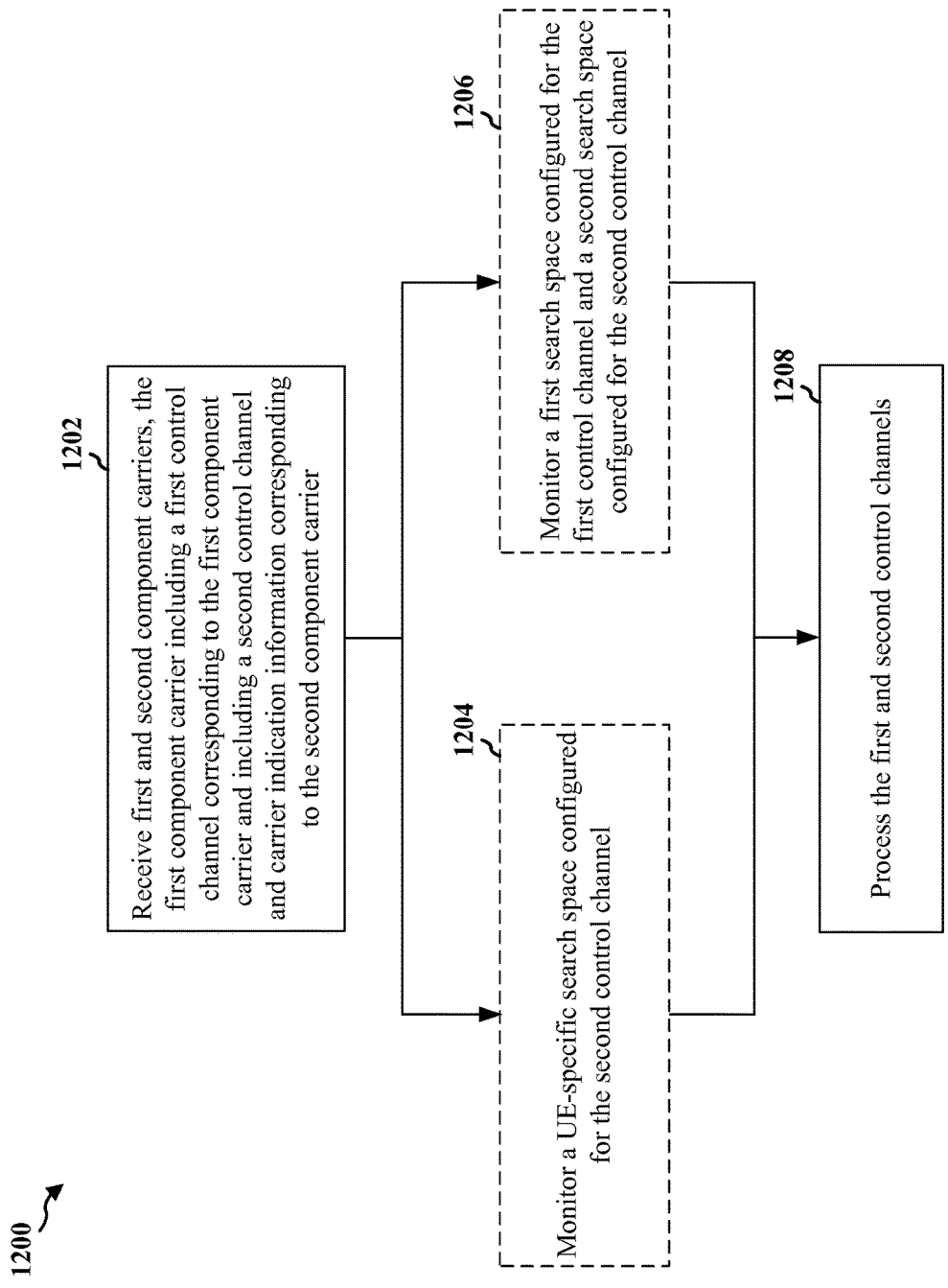
FIG. 12 includes a flow chart of a method of wireless communication.

FIG. 12 includes a flow chart 1200 of a method of wireless communication. The method may be performed by a UE.

At step 1202, the UE receives a first component carrier and a second component carrier. The first component carrier may include a first control channel corresponding to the first component carrier and may further include a second control channel and carrier indication information corresponding to the second component carrier. In other aspects, the UE may receive a greater number of component carriers.

The second control channel may be one of several types of control channels. For example, the second control channel may be a legacy type of control channel (e.g., PDCCH) or a new type of control channel (e.g., EPDCCH). A value of the carrier indication information (also referred to as "CIF") corresponding to the second component carrier may support the several types of control channels. In an aspect, a value of the carrier indication information identifies the second component carrier for both the first and second types of control channels. For example, the carrier indication information corresponding to the second component carrier may be represented as a 3-bit value (e.g., "001") and such 3-bit value may be employed when the control channel is a legacy type of control channel (e.g., PDCCH) or a new type of control channel (e.g., EPDCCH). In an aspect, the value of the carrier indication information corresponding to the second component carrier may be included in the second control channel based on an RRC configuration.

In an aspect, the second control channel may be of the first type of control channel in a first subframe and may be of the second type of control channel in a second subframe. For example, with reference to FIG. 10, the second control channel may be PDCCH received in region 1002 in subframe 1 and may be EPDDCH received in region 1004 in subframe 2.

In an aspect, the first control channel may include carrier indication information corresponding to the first component carrier. In such aspect, a value of the carrier indication information corresponding to the first component carrier identifies the first component carrier for both the first and second types of control channels.

In an aspect, the first component carrier is configured as a primary component carrier and the second component carrier may be configured as a secondary component carrier. In another aspect, the first component carrier is configured as a first secondary component carrier and the second component carrier may be configured as a second secondary component carrier.

At step 1204, the UE monitors a UE-specific search space configured for the second control channel.

At step 1206, when the first control channel and the second control channel are EPDCCH and a common set of resources are configured for the first control channel and the second control channel, the UE monitors a first search space configured for the first control channel and a second search space configured for the second control channel. The first and second search spaces may share the common set of resources. In an aspect, an offset is configured between the first and second search spaces.

At step 1208, the UE processes the first and second control channels. For example, the UE may process the first and second control channels by decoding the first and second control channels to determine control information included in the first and second control channels.

It should be understood that the steps 1204 and 1206 indicated with dotted lines in FIG. 12 represent optional and alternative steps. For example, in an aspect, steps 1202, 1204, and 1208 may be performed without performing step 1206. As another example, in an aspect, steps 1202, 1206, and 1208 may be performed without performing step 1204.

Figure 13:
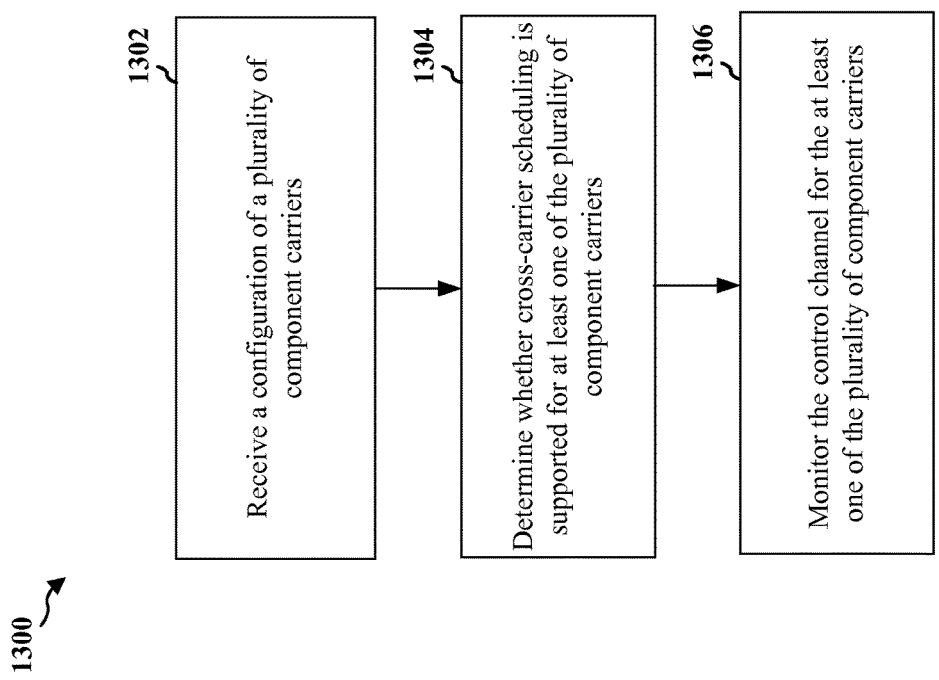
FIG. 13 includes a flow chart of a method of wireless communication.

FIG. 13 includes a flow chart 1300 of a method of wireless communication. The method may be performed by a UE.

At step 1302, the UE receives a configuration of a plurality of component carriers at a UE in a wireless access network. At least one of the plurality of component carriers may be configured as a primary component carrier and at least one of the plurality of component carriers may be configured as a secondary component carrier. At least one of the plurality of component carriers may be a secondary component carrier.

At step 1304, the UE determines whether cross-carrier scheduling is supported for at least one of the plurality of component carriers based on a type of a control channel. Determining whether cross-carrier scheduling is supported may be based on a signaling received from a cell.

At step 1306, the UE monitors the control channel for the at least one of the plurality of component carriers based on the determination.

In some aspects, the UE determines a CIF included in downlink control information transmitted using the control channel when cross-carrier scheduling is determined to be supported.

In some aspects, the type of the control channel is at least one of a legacy PDCCH and an EPDCCH. Cross-carrier scheduling may be determined to be supported for the legacy PDCCH, and cross-carrier scheduling may be determined to be not supported for the EPDCCH for the at least one of the plurality of component carriers. Cross-carrier scheduling may be determined to be supported for the legacy PDCCH for the at least one of the plurality of component carriers only if EPDCCH is not configured for the at least one of the plurality of component carriers. Cross-carrier scheduling may be determined to be supported for the legacy PDCCH for the at least one of the plurality of component carriers and the legacy PDCCH may be transmitted on a different component carrier. EPDCCH may be supported for the at least one of the plurality of component carriers and may be transmitted on the at least one of the plurality of component carriers.

In some aspects, cross-carrier scheduling may be determined to be supported for both the legacy PDCCH and the EPDCCH for the at least one of the plurality of component carriers. The cross-carrier scheduling for the at least one of the plurality of component carriers may share a common definition for the legacy PDCCH and the EPDCCH. The common definition may include at least one of a definition of a cross-carrier indication field, a signaling to enable or disable cross-carrier scheduling, and a same component carrier to transmit the legacy PDCCH and the EPDCCH for the at least one of the plurality of component carriers. A component carrier in the plurality of component carriers may contain search spaces for EPDCCH for two or more component carriers. The search spaces may share a common resource set configured for EPDCCH. The search spaces may have separately configured resource sets. The EPDCCH for the two or more component carriers may share at least one of a common rate matching operation and a quasi-co-location operation.

In some aspects, wherein EPDCCH may be configured for the at least one of the plurality of component carriers and cross-carrier scheduling may be determined to be not supported for both the legacy PDCCH and the EPDCCH for the at least one of the plurality of component carriers. The EPDCCH may be configured on the at least one of the plurality of component carriers for a subset of downlink subframes. In a subframe when EPDCCH is not configured, the UE skips monitoring legacy PDCCH in the subframe.

In some aspects, monitoring the control channel further comprises monitoring at least one of a common search space and a UE-specific search space.

Figure 14:
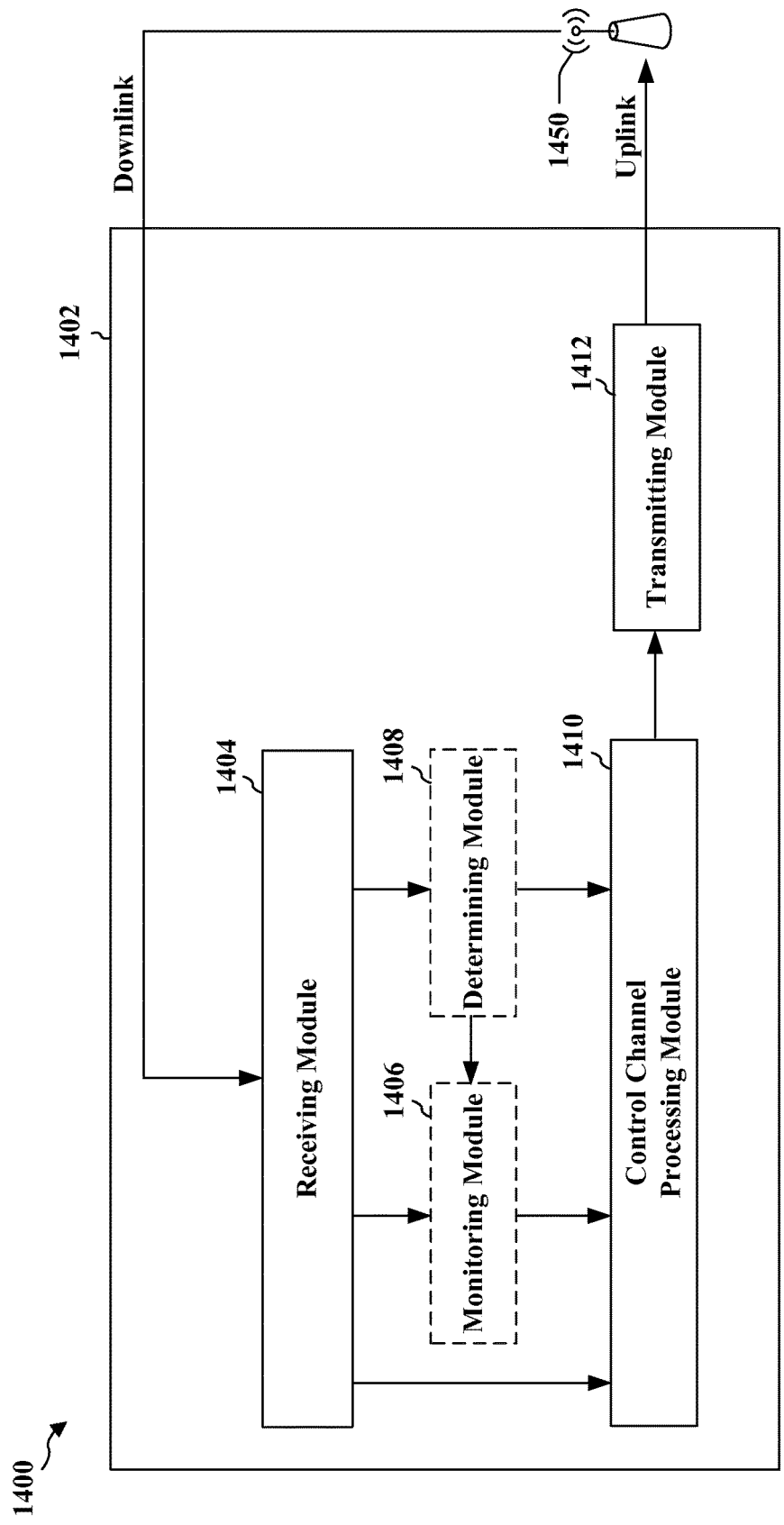
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. The apparatus includes a module 1404 that receives a first component carrier and a second component carrier, a module 1406 that monitors a UE-specific search space configured for the second control channel and monitors a first search space configured for the first control channel and a second search space configured for the second control channel, a module 1408 that determines whether cross-carrier scheduling is supported for at least one of the first and second component carriers, module 1410 that processes the first and/or second control channel, and a module 1412 that sends transmissions to a wireless network (e.g., eNB 1450).

The apparatus may include additional modules that perform each of the steps of the algorithm in the aforementioned flow charts of FIGS. 12 and 13. As such, each step in the aforementioned flow charts of FIGS. 12 and 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
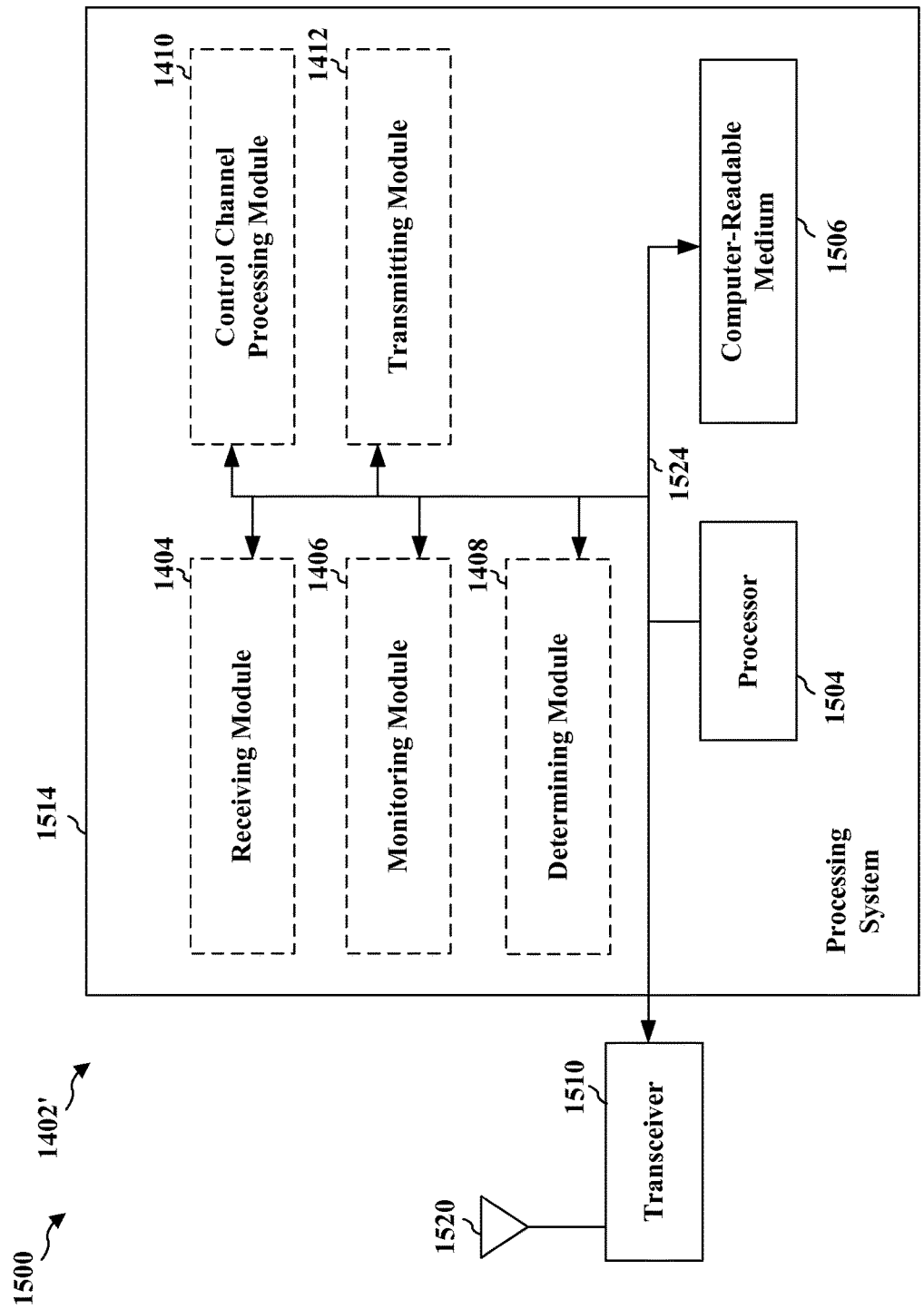
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, and 1412, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408, 1410, and 1412. The modules may be software modules running in the processor 1504, resident/stored in the computer readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for receiving a first component carrier and a second component carrier, means for determining whether cross-carrier scheduling is supported for at least one of the first and second component carriers, means for monitoring a UE-specific search space configured for the second control channel, means for monitoring a first search space configured for the first control channel and a second search space configured for the second control channel, the first and second search spaces sharing the common set of resources, means for processing the first and second control channels, and means for sending transmissions to a wireless network.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 16:
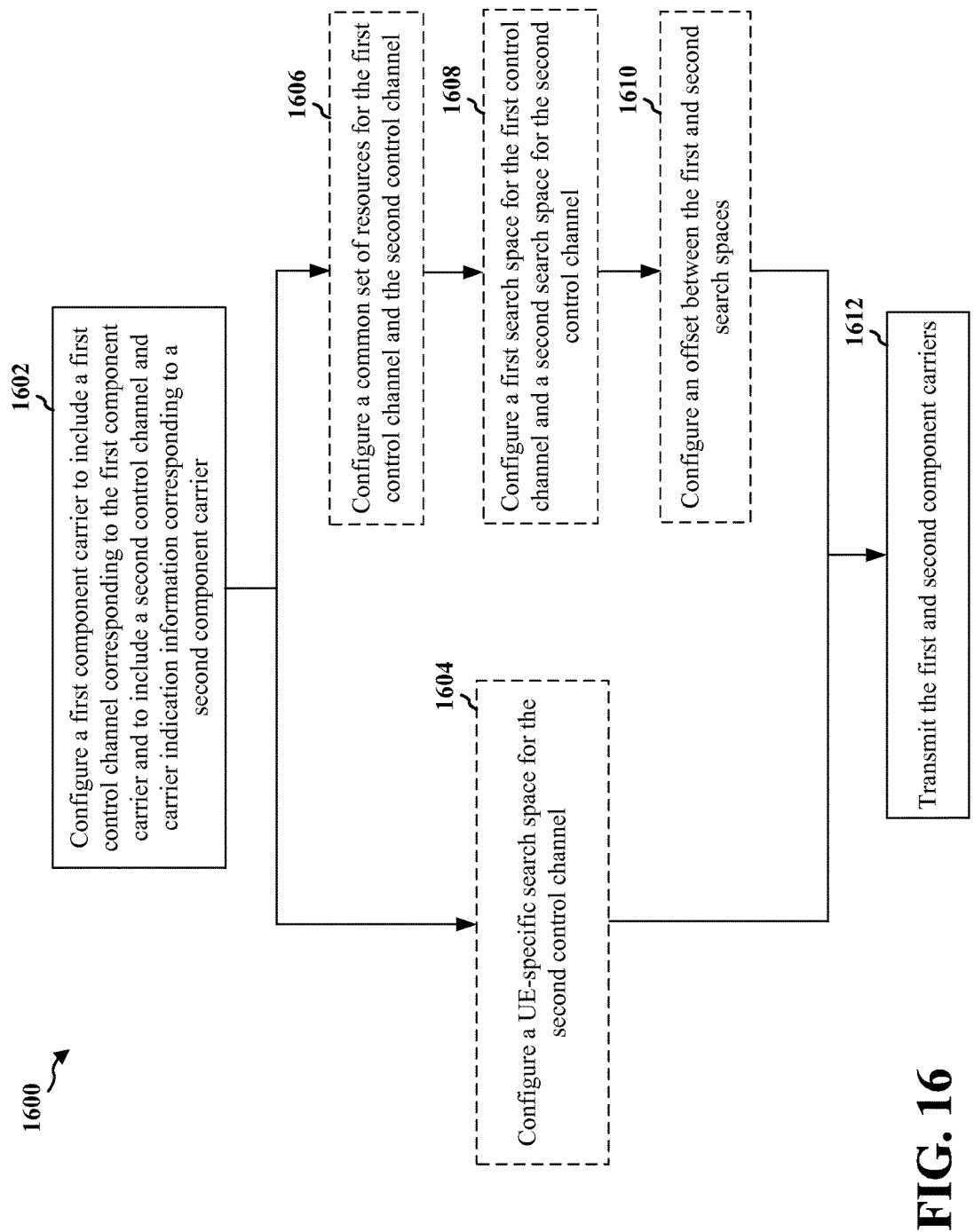
FIG. 16 includes a flow chart of a method of wireless communication.

FIG. 16 includes a flow chart 1600 of a method of wireless communication. The method may be performed by an eNB.

At step 1602, the eNB configures a first component carrier to include a first control channel corresponding to the first component carrier and to include a second control channel and carrier indication information corresponding to a second component carrier. In other aspects, the eNB may configure a greater number of component carriers.

The second control channel may be one of several types of control channels. For example, the second control channel may be a legacy type of control channel (e.g., PDCCH) or a new type of control channel (e.g., EPDCCH). A value of the carrier indication information (also referred to as "CIF") corresponding to the second component carrier may support the several types of control channels. In an aspect, a value of the carrier indication information identifies the second component carrier for both the first and second types of control channels. For example, the carrier indication information corresponding to the second component carrier may be represented as a 3-bit value (e.g., "001") and such 3-bit value may be employed when the control channel is a legacy type of control channel (e.g., PDCCH) or a new type of control channel (e.g., EPDCCH). In an aspect, the value of the carrier indication information corresponding to the second component carrier may be included in the second control channel based on an RRC configuration.

In an aspect, the second control channel may be of the first type of control channel in a first subframe and may be of the second type of control channel in a second subframe. For example, with reference to FIG. 10, the second control channel may be PDCCH received in region 1002 in subframe 1 and may be EPDDCH received in region 1004 in subframe 2.

In an aspect, the first control channel may include carrier indication information corresponding to the first component carrier. In such aspect, a value of the carrier indication information corresponding to the first component carrier identifies the first component carrier for both the first and second types of control channels.

In an aspect, the first component carrier is configured as a primary component carrier and the second component carrier is configured as a secondary component carrier. In another aspect, the first component carrier is configured as a first secondary component carrier and the second component carrier is configured as a second secondary component carrier.

At step 1604, the eNB configures a UE-specific search space for the second control channel.

At step 1606, when the first control channel and the second control channel are EPDCCH, the eNB configures a common set of resources for the first control channel and the second control channel.

At step 1608, the eNB configures a first search space for the first control channel and a second search space for the second control channel, the first and second search spaces sharing the common set of resources.

At step 1610, the eNB configures an offset between the first and second search spaces.

At step 1612, the eNB transmits the first and second component carriers.

It should be understood that the steps 1604, 1606, 1608, and 1610 indicated with dotted lines in FIG. 16 represent optional steps. For example, in an aspect, steps 1602, 1604, and 1612 may be performed without performing steps 1606, 1608, and 1610. As another example, in an aspect, step 1602, one or more of steps 1606, 1608, and 1610, and step 1612 may be performed without performing step 1604.

Figure 17:
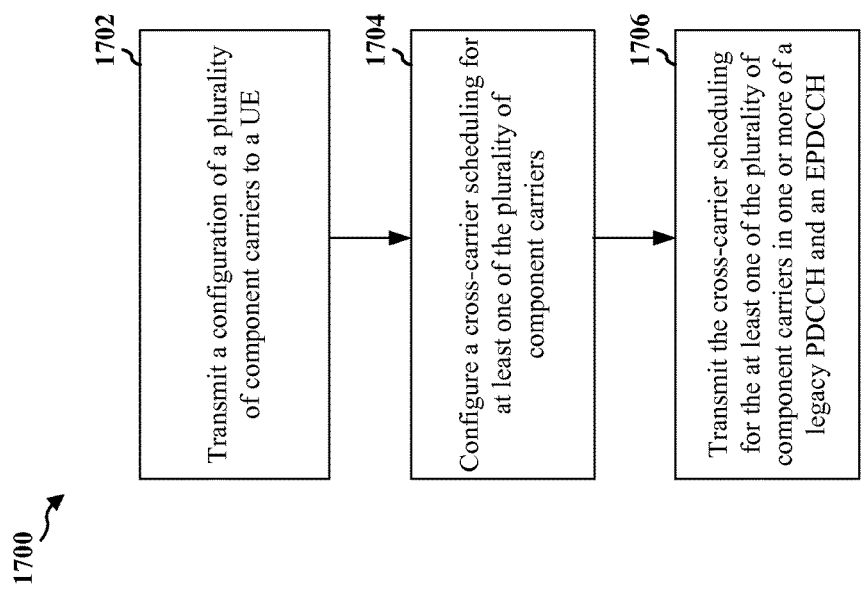
FIG. 17 includes a flow chart of a method of wireless communication.

FIG. 17 includes a flow chart 1700 of a method of wireless communication. The method may be performed by an eNB. At step 1702, the eNB transmits a configuration of a plurality of component carriers to a UE in a wireless access network.

At step 1704, the eNB configures a cross-carrier scheduling for at least one of the plurality of component carriers.

At step 1706, the eNB transmits the cross-carrier scheduling for the at least one of the plurality of component carriers in one or more of a legacy PDCCH and an EPDCCH. In some aspects, cross-carrier scheduling is not transmitted in the EPDCCH when the cross-carrier scheduling is transmitted in the legacy PDCCH.

In some aspects, cross-carrier scheduling is transmitted on the EPDCCH on a first one of the plurality of component carriers when cross-carrier scheduling is transmitted in the legacy PDCCH for the at least one of the plurality of component carriers, and wherein the legacy PDCCH is transmitted on a different one of the plurality of component carriers. The cross-carrier scheduling may be transmitted on both the legacy PDCCH and the EPDCCH for at least one of the plurality of component carriers. The legacy PDCCH and the EPDCCH may share a common definition that includes at least one of a definition of a cross-carrier indication field, a signaling to enable or disable cross-carrier scheduling, and a same component carrier to transmit the legacy PDCCH and the EPDCCH for the at least one of the plurality of component carriers.

In some aspects, a component carrier in the plurality of component carriers contains search spaces for EPDCCH for two or more component carriers. The search spaces may share a common resource set configured for EPDCCH. The search spaces may have separately configured resource sets. The EPDCCH for the two or more component carriers may share at least one of a common rate matching operation and a quasi-co-location operation.

In some aspects, cross-carrier scheduling is transmitted in EPDCCH for at least one of the plurality of component carriers when cross-carrier scheduling is not transmitted in both the legacy PDCCH and the EPDCCH. The EPDCCH may be transmitted on at least one of the plurality of component carriers for a subset of downlink subframes. At least one of the plurality of component carriers may be configured as a primary component carrier and at least one of the plurality of component carriers may be configured as a secondary component carrier.

In some aspects, a CIF is configured in the one or more of the PDCCH and the EPDDCH.

Figure 18:
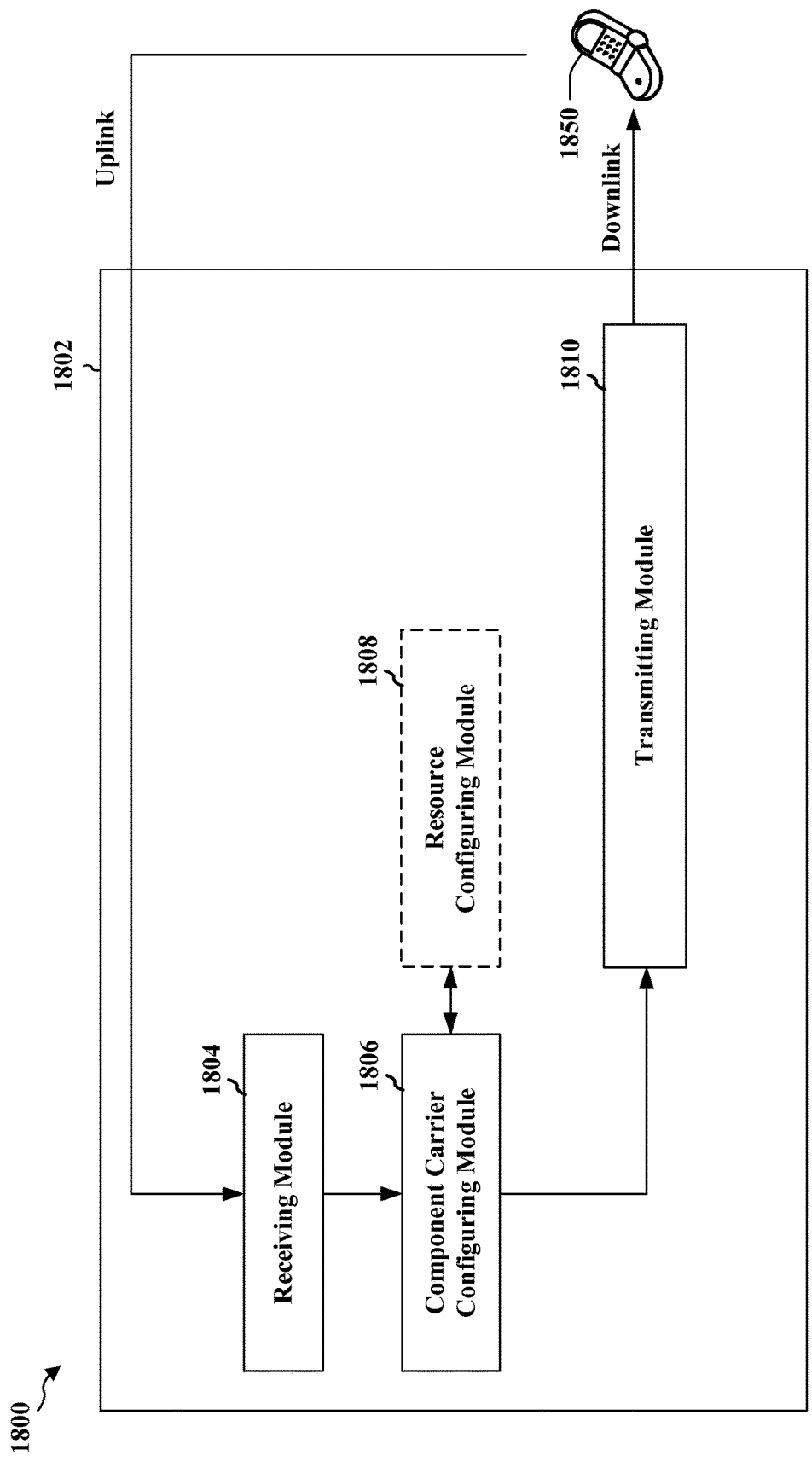
FIG. 18 is a conceptual data flow diagram illustrating the data flow between different modules/means/components in an exemplary apparatus.

FIG. 18 is a conceptual data flow diagram 1800 illustrating the data flow between different modules/means/components in an exemplary apparatus 1802. The apparatus may be an eNB. The apparatus includes a module 1804 for receiving signals from a UE, a module 1806 that configures a cross-carrier scheduling for at least one of the first and second component carriers and that configures a first component carrier to include a first control channel corresponding to the first component carrier and to include a second control channel and carrier indication information corresponding to a second component carrier, and a module 1808 that configures a common set of resources for the first control channel and the second control channel when the first control channel and the second control channel are EPDCCH. The module 1808 further configures a first search space for the first control channel and a second search space for the second control channel, the first and second search spaces sharing the common set of resources. The module 1808 further configures an offset between the first and second search spaces and configures a UE-specific search space for the second control channel. The apparatus further includes a module 1810 that transmits the first and second component carriers and the configuration and scheduling to a UE 1850.

The apparatus may include additional modules that perform each of the steps of the algorithm in the aforementioned flow charts of FIGS. 16 and 17. As such, each step in the aforementioned flow charts of FIGS. 16 and 17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 19:
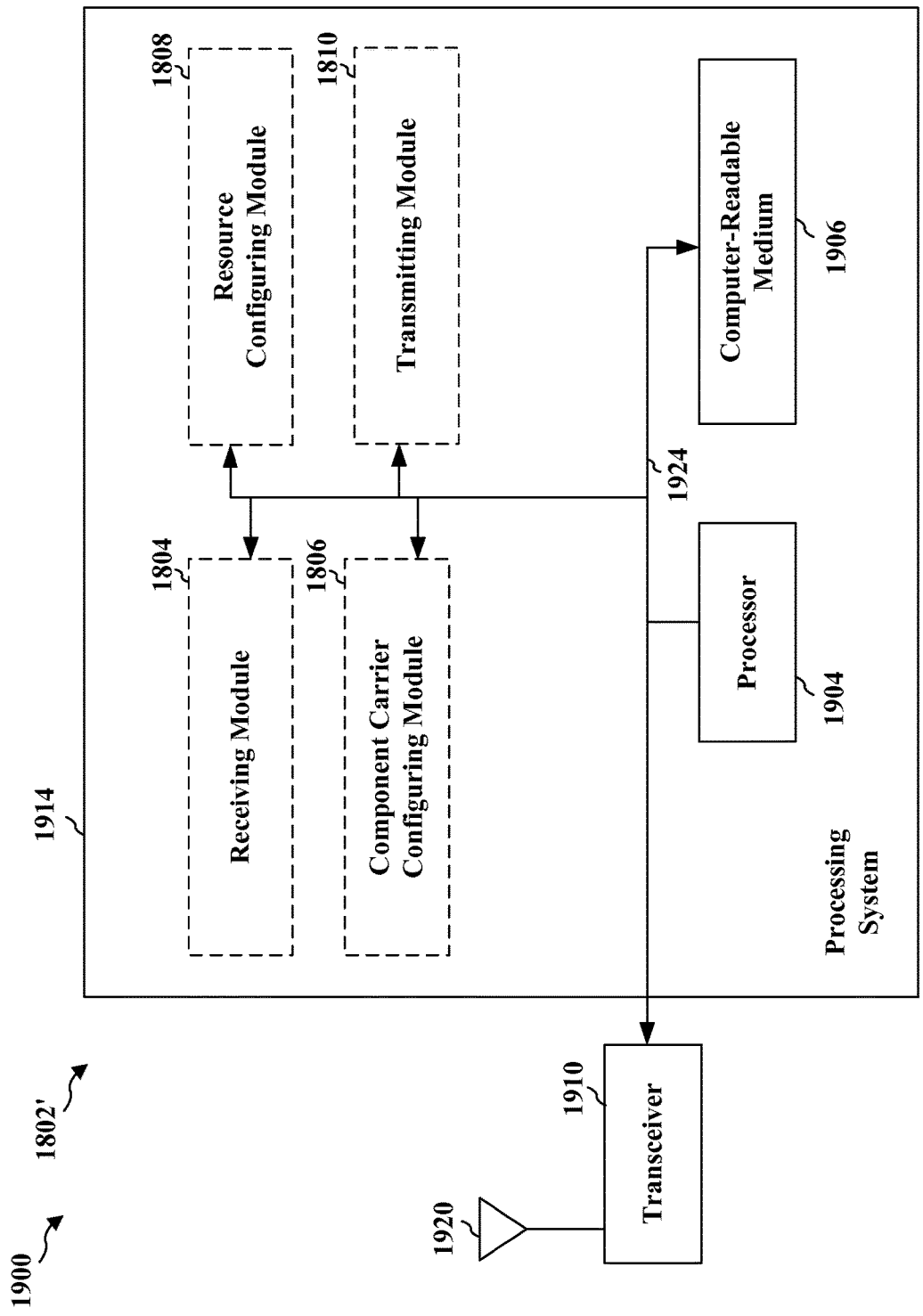
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1804, 1806, 1808, and 1810, and the computer-readable medium 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The processing system 1914 includes a processor 1904 coupled to a computer-readable medium 1906. The processor 1904 is responsible for general processing, including the execution of software stored on the computer-readable medium 1906. The software, when executed by the processor 1904, causes the processing system 1914 to perform the various functions described supra for any particular apparatus. The computer-readable medium 1906 may also be used for storing data that is manipulated by the processor 1904 when executing software. The processing system further includes at least one of the modules 1804, 1806, 1808, and 1810. The modules may be software modules running in the processor 1904, resident/stored in the computer readable medium 1906, one or more hardware modules coupled to the processor 1904, or some combination thereof. The processing system 1914 may be a component of the eNB 610 and may include the memory 676 and/or at least one of the TX processor 616, the RX processor 670, and the controller/processor 675.

In one configuration, the apparatus 1802/1802' for wireless communication includes means for receiving transmissions from a UE, means for configuring a cross-carrier scheduling for at least one of the plurality of component carriers, means for configuring a first component carrier to include a first control channel corresponding to the first component carrier and to include a second control channel and carrier indication information corresponding to a second component carrier, means for configuring a common set of resources for the first control channel and the second control channel, means for configuring a first search space for the first control channel and a second search space for the second control channel, the first and second search spaces sharing the common set of resources, means for configuring an offset between the first and second search spaces, means for configuring a UE-specific search space for the second control channel, and means for transmitting the cross-carrier scheduling for the at least one of the plurality of component carriers in one or more of a legacy PDCCH and an EPDCCH and for transmitting the first and second component carriers.

The aforementioned means may be one or more of the aforementioned modules of the apparatus 1802 and/or the processing system 1914 of the apparatus 1802' configured to perform the functions recited by the aforementioned means. As described supra, the processing system 1914 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment, comprising:
    receiving a control signaling indicating that a carrier indication information is enabled, wherein the control signaling indicating that the carrier indication information is enabled comprises a common control signal for both a first type of control channel and a second type of control channel, the common control signal indicating that the carrier indication information is enabled for both the first type of control channel and the second type of control channel;
    receiving a first component carrier and a second component carrier, the first component carrier comprising:
        a subframe including one of:
            a first control channel configured to schedule resources for at least one of the first component carrier or the second component carrier, wherein the first control channel is the first type of control channel, or
            a second control channel configured to schedule resources for at least one of the first component carrier or the second component carrier, wherein the second control channel is the second type of control channel, and
        the carrier indication information having a value and positioned in a first type of control channel or the second type of control channel, wherein when the value comprises a first value, the carrier indication information identifies that the first type of control channel or the second type of control channel schedules the resources on the first component carrier, and when the value comprises a second value, the carrier indication information identifies that the first type of control channel or the second type of control channel schedules the resources on the second component carrier; and
    processing the subframe, according to the value of the carrier indication information, based on the first control channel or the second control channel.

2. The method of claim 1, wherein the first type of control channel is a legacy physical downlink control channel (PDCCH) and the second type of control channel is an enhanced physical downlink control channel (EPDCCH).

3. The method of claim 1, wherein the first component carrier is configured as a primary component carrier and the second component carrier is configured as a secondary component carrier.

4. The method of claim 1, wherein the first component carrier, which comprises the first control channel or the second control channel and comprises the carrier indication information, is configured as a first secondary component carrier and the second component carrier is configured as a second secondary component carrier.

5. The method of claim 1, wherein the first control channel and the second control channel are an enhanced physical downlink control channel (EPDCCH), wherein a common set of resources are configured for the first control channel and the second control channel.

6. The method of claim 5, further comprising monitoring a first search space configured for the first control channel and a second search space configured for the second control channel, the first and second search spaces sharing the common set of resources.

7. The method of claim 6, wherein the second search space is offset from the first search space.

8. The method of claim 1, wherein the first control channel comprises carrier indication information corresponding to the first component carrier, and
wherein a value of the carrier indication information corresponding to the first component carrier identifies the first component carrier for both the first and second types of control channels.

9. The method of claim 1, wherein the value of the carrier indication information is included in the second control channel based on a radio-resource-control (RRC) configuration.

10. The method of claim 1, wherein:
the subframe is a first subframe including the first control channel,
the second control channel is included in a second subframe, and
the first subframe is different from the second subframe.

11. The method of claim 1, further comprising monitoring a UE-specific search space configured for the second control channel.

12. The method of claim 1, wherein the carrier identification information is used to identify whether the first type of control channel or the second type of control channel is used for cross-carrier scheduling in different subframes.

13. The method of claim 1, further comprising:
determining whether to process the subframe based on the first control channel or the second control channel, wherein the determination is based on the value of the received carrier indication information.

14. The method of claim 1, wherein the first type of control channel and the second type of control channel are both downlink control channels, and wherein the control signaling indicating that the carrier indication information is enabled indicates that the carrier indication information is enabled for both the first type of control channel and the second type of control channel.

15. The method of claim 1, wherein the first type of control channel comprises a legacy physical downlink control channel (PDCCH) and the second type of control channel comprises an enhanced physical downlink control channel (EPDCCH), and wherein the control signaling indicating that the carrier indication information is enabled indicates that the carrier indication information is enabled for both the legacy PDCCH and the ePDCCH.

16. An apparatus for wireless communication at a user equipment, comprising:
means for receiving a control signaling indicating that a carrier indication information is enabled and for receiving a first component carrier and a second component carrier, wherein the control signaling indicating that the carrier indication information is enabled comprises a common control signal for both a first type of control channel and a second type of control channel, the common control signal indicating that the carrier indication information is enabled for both the first type of control channel and the second type of control channel, the first component carrier comprising:
a subframe including one of:
a first control channel configured to schedule resources for at least one of the first component carrier or the second component carrier, wherein the first control channel is the first type of control channel, or
a second control channel configured to schedule resources for at least one of the first component carrier or the second component carrier, wherein the second control channel is the second type of control channel, and
the carrier indication information having a value and positioned in a first type of control channel or the second type of control channel, wherein when the value comprises a first value, the carrier indication information identifies that the first type of control channel or the second type of control channel schedules the resources on the first component carrier, and when the value comprises a second value, the carrier indication information identifies that the first type of control channel or the second type of control channel schedules the resources on the second component carrier; and
means for processing the subframe, according to the value of the carrier indication information, based on the first control channel or second control channel.

17. The apparatus of claim 16, wherein the first type of control channel is a legacy physical downlink control channel (PDCCH) and the second type of control channel is an enhanced physical downlink control channel (EPDCCH).

18. The apparatus of claim 16, wherein the first component carrier is configured as a primary component carrier and the second component carrier is configured as a secondary component carrier.

19. The apparatus of claim 16, wherein the first component carrier, which comprises the first control channel or the second control channel and comprises the carrier indication information, is configured as a first secondary component carrier and the second component carrier is configured as a second secondary component carrier.

20. The apparatus of claim 16, wherein the first control channel and the second control channel are an enhanced physical downlink control channel (EPDCCH), wherein a common set of resources are configured for the first control channel and the second control channel.

21. The apparatus of claim 20, further comprising means for monitoring a first search space configured for the first control channel and a second search space configured for the second control channel, the first and second search spaces sharing the common set of resources.

22. The apparatus of claim 21, wherein the second search space is offset from the first search space.

23. The apparatus of claim 16, wherein the first control channel comprises carrier indication information corresponding to the first component carrier, and
wherein a value of the carrier indication information corresponding to the first component carrier identifies the first component carrier for both the first and second types of control channels.

24. The apparatus of claim 16, wherein the value of the carrier indication information is included in the second control channel based on a radio-resource-control (RRC) configuration.

25. The apparatus of claim 16, wherein:
the subframe is a first subframe including the first control channel,
the second control channel is included in a second subframe, and
the first subframe is different from the second subframe.

26. The apparatus of claim 16, further comprising means for monitoring a UE-specific search space configured for the second control channel.

27. The apparatus of claim 16, wherein the carrier identification information is used to identify whether the first type of control channel or the second type of control channel is used for cross-carrier scheduling in different subframes.

28. An apparatus for wireless communication at a user equipment, comprising:
a memory; and
at least one processor coupled to the memory and configured to:
receive a control signaling indicating that a carrier indication information is enabled, wherein the control signaling indicating that the carrier indication information is enabled comprises a common control signal for both a first type of control channel and a second type of control channel, the common control signal indicating that the carrier indication information is enabled for both the first type of control channel and the second type of control channel;
receive a first component carrier and a second component carrier, the first component carrier comprising:
a subframe including one of:
a first control channel configured to schedule resources for at least one of the first component carrier or the second component carrier, wherein the first control channel is the first type of control channel, and
a second control channel configured to schedule resources for at least one of the first component carrier or the second component carrier, wherein the second control channel is the second type of control channel, and
the carrier indication information having a value and positioned in a first type of control channel or the second type of control channel, wherein when the value comprises a first value, the carrier indication information identifies that the first type of control channel or the second type of control channel schedules the resources on the first component carrier, and when the value comprises a second value, the carrier indication information identifies that the first type of control channel or the second type of control channel schedules the resources on the second component carrier; and
process the subframe, according to the value of the carrier indication information, based on the first control channel or second control channel.

29. The apparatus of claim 28, wherein the first type of control channel is a legacy physical downlink control channel (PDCCH) and the second type of control channel is an enhanced physical downlink control channel (EPDCCH).

30. The apparatus of claim 28, wherein the first component carrier is configured as a primary component carrier and the second component carrier is configured as a secondary component carrier.

31. The apparatus of claim 28, wherein the first component carrier, which comprises the first control channel or the second control channel and comprises the carrier indication information, is configured as a first secondary component carrier and the second component carrier is configured as a second secondary component carrier.

32. The apparatus of claim 28, wherein the first control channel and the second control channel are an enhanced physical downlink control channel (EPDCCH), wherein a common set of resources are configured for the first control channel and the second control channel.

33. The apparatus of claim 32, wherein the at least one processor is further configured to monitor a first search space configured for the first control channel and a second search space configured for the second control channel, the first and second search spaces sharing the common set of resources.

34. The apparatus of claim 33, wherein the second search space is offset from the first search space.

35. The apparatus of claim 28, wherein the first control channel comprises carrier indication information corresponding to the first component carrier, and wherein a value of the carrier indication information corresponding to the first component carrier identifies the first component carrier for both the first and second types of control channels.

36. The apparatus of claim 28, wherein the value of the carrier indication information is included in the second control channel based on a radio-resource-control (RRC) configuration.

37. The apparatus of claim 28, wherein:
the subframe is a first subframe including the first control channel,
the second control channel is included in a second subframe, and
the first subframe is different from the second subframe.

38. The apparatus of claim 28, wherein the at least one processor is further configured to monitor a UE-specific search space configured for the second control channel.

39. The apparatus of claim 28, wherein the carrier identification information is used to identify whether the first type of control channel or the second type of control channel is used for cross-carrier scheduling in different subframes.

40. A non-transitory computer-readable medium storing computer executable code for wireless communication at a user equipment, comprising code for:
receiving a control signaling indicating that a carrier indication information is enabled, wherein the control signaling indicating that the carrier indication information is enabled comprises a common control signal for both a first type of control channel and a second type of control channel, the common control signal indicating that the carrier indication information is enabled for both the first type of control channel and the second type of control channel;
receiving a first component carrier and a second component carrier, the first component carrier comprising:
a subframe including one of:
a first control channel configured to schedule resources for at least one of the first component carrier or the second component carrier, wherein the first control channel is the first type of control channel, or
a second control channel configured to schedule resources for at least one of the first component carrier or the second component carrier, wherein the second control channel is the second type of control channel, and
the carrier indication information having a value and positioned in a first type of control channel or the second type of control channel, wherein when the value comprises a first value, the carrier indication information identifies that the first type of control channel or the second type of control channel schedules the resources on the first component carrier, and when the value comprises a second value, the carrier indication information identifies that the first type of control channel or the second type of control channel schedules the resources on the second component carrier; and processing the subframe, according to value of the carrier indication information, based on the first control channel or the second control channel.

\* \* \* \* \*